United States Patent
Ito

(10) Patent No.: US 9,561,788 B2
(45) Date of Patent: Feb. 7, 2017

(54) HYBRID WORK VEHICLE

(71) Applicant: KCM Corporation, Inami-cho, Kako-gun, Hyogo (JP)

(72) Inventor: Noritaka Ito, Ushiku (JP)

(73) Assignee: KCM Corporation, Hyogo (JP)

( * ) Notice: Subject to any disclaimer, the term of this patent is extended or adjusted under 35 U.S.C. 154(b) by 162 days.

(21) Appl. No.: 14/378,760

(22) PCT Filed: Feb. 14, 2013

(86) PCT No.: PCT/JP2013/053570
§ 371 (c)(1),
(2) Date: Aug. 14, 2014

(87) PCT Pub. No.: WO2013/122167
PCT Pub. Date: Aug. 22, 2013

(65) Prior Publication Data
US 2015/0006010 A1    Jan. 1, 2015

(30) Foreign Application Priority Data

Feb. 15, 2012    (JP) ................................ 2012-031149

(51) Int. Cl.
*B60W 10/08* (2006.01)
*B60W 10/30* (2006.01)
(Continued)

(52) U.S. Cl.
CPC .............. *B60W 10/06* (2013.01); *B60L 1/003* (2013.01); *B60L 11/005* (2013.01); *B60L 11/08* (2013.01);
(Continued)

(58) Field of Classification Search
None
See application file for complete search history.

(56) References Cited

U.S. PATENT DOCUMENTS 5,930,996 A    8/1999 Nakamura et al.
7,273,124 B2 *    9/2007 Tatsuno .................. B60K 17/10
180/305

(Continued)

FOREIGN PATENT DOCUMENTS

CN    1745237 A    3/2006
EP    1 571 352 A1    9/2005
(Continued)

OTHER PUBLICATIONS

International Search Report dated Mar. 19, 2013 with English translation (three (3) pages).
(Continued)

*Primary Examiner* — Jerrah Edwards
*Assistant Examiner* — Demetra Smith-Stewart
(74) *Attorney, Agent, or Firm* — Crowell & Moring LLP

(57) ABSTRACT

A hybrid work vehicle includes: a work device; a traveling drive device; a lever operation quantity detection unit that detects a lever operation quantity of a control lever operated to control the work device; an engagement state detection unit that detects an engaged state and a non-engaged state of the work device; a pedal operation quantity detection unit that detects a pedal operation quantity of an accelerator pedal; a travel state detection unit that detects a traveling state and a non-traveling state of the traveling drive; and an engine control unit that controls an engine rotation rate based upon at least either the lever operation quantity or the pedal operation quantity in correspondence to either the engaged state or the non-engaged state and either the traveling state or the non-traveling state.

16 Claims, 21 Drawing Sheets

(51) Int. Cl.
- *B60W 20/00* (2016.01)
- *B60W 10/06* (2006.01)
- *B60L 11/08* (2006.01)
- *E02F 9/20* (2006.01)
- *E02F 9/22* (2006.01)
- *B60L 1/00* (2006.01)
- *B60L 11/00* (2006.01)
- *B60L 11/12* (2006.01)
- *B60W 30/18* (2012.01)

(52) U.S. Cl.
CPC .......... *B60L 11/126* (2013.01); *B60W 10/08* (2013.01); *B60W 20/00* (2013.01); *B60W 30/18054* (2013.01); *E02F 9/2004* (2013.01); *E02F 9/2075* (2013.01); *E02F 9/2079* (2013.01); *E02F 9/2095* (2013.01); *E02F 9/2203* (2013.01); *E02F 9/2235* (2013.01); *E02F 9/2246* (2013.01); *E02F 9/2296* (2013.01); *B60L 2200/40* (2013.01); *B60L 2240/423* (2013.01); *B60L 2240/441* (2013.01); *B60L 2250/24* (2013.01); *B60L 2250/26* (2013.01); *B60W 2300/17* (2013.01); *B60W 2520/04* (2013.01); *B60W 2540/00* (2013.01); *B60W 2540/10* (2013.01); *B60W 2710/0644* (2013.01); *Y02T 10/6217* (2013.01); *Y02T 10/642* (2013.01); *Y02T 10/7022* (2013.01); *Y02T 10/7077* (2013.01); *Y10S 903/93* (2013.01)

(56) References Cited

U.S. PATENT DOCUMENTS

| | | | |
|---|---|---|---|
| 7,370,475 | B2 | 5/2008 | Nakamura et al. |
| 7,493,978 | B2 | 2/2009 | Nakamura et al. |
| 7,959,538 | B2 | 6/2011 | Hatanaka |
| 8,668,624 | B2 | 3/2014 | Hyodo et al. |
| 8,812,197 | B2* | 8/2014 | Itou .......... B60K 6/48 180/242 |
| 2006/0200292 | A1 | 9/2006 | Asakage |
| 2007/0169743 | A1* | 7/2007 | Kobayashi .......... A01D 34/67 123/352 |
| 2009/0111655 | A1 | 4/2009 | Hatanaka |
| 2009/0265065 | A1* | 10/2009 | Ikari .......... E02F 9/2292 701/50 |
| 2010/0222951 | A1 | 9/2010 | Tanaka et al. |
| 2011/0137502 | A1 | 6/2011 | Kato et al. |
| 2012/0202646 | A1* | 8/2012 | Suzuki .......... B60W 10/02 477/5 |
| 2012/0247846 | A1* | 10/2012 | Ichikawa .......... B60H 1/00207 180/65.21 |
| 2014/0053683 | A1* | 2/2014 | West .......... F16H 37/065 74/661 |

FOREIGN PATENT DOCUMENTS

| | | |
|---|---|---|
| EP | 2 284 322 A2 | 2/2011 |
| EP | 2 363 537 A1 | 9/2011 |
| JP | 11-107321 A | 4/1999 |
| JP | 2000-197215 A | 7/2000 |
| JP | 2003-261964 A | 9/2003 |
| JP | 2005-12900 A | 1/2005 |
| JP | 2005-54414 A | 3/2005 |
| JP | 2005-133319 A | 5/2005 |
| JP | 2005-155494 A | 6/2005 |
| JP | 2007-326408 A | 12/2007 |
| JP | 2008-115923 A | 5/2008 |
| JP | 2009-73607 A | 4/2009 |
| JP | 2010-30599 A | 2/2010 |
| JP | 2011-47342 A | 3/2011 |
| JP | 2011-116241 A | 6/2011 |
| JP | 2011-117398 A | 6/2011 |
| WO | WO 2007/043290 A1 | 4/2007 |
| WO | WO 2010/147232 A1 | 12/2010 |

OTHER PUBLICATIONS

Japanese Office Action dated Mar. 31, 2015 (six pages).
European Search Report issued in European Application No. 13749780.6 dated Mar. 2, 2016 (seven pages).
Chinese Office Action issued in counterpart Chinese Application No. 201380009740.5 dated May 4, 2016 (six pages).

\* cited by examiner

FIG. 5
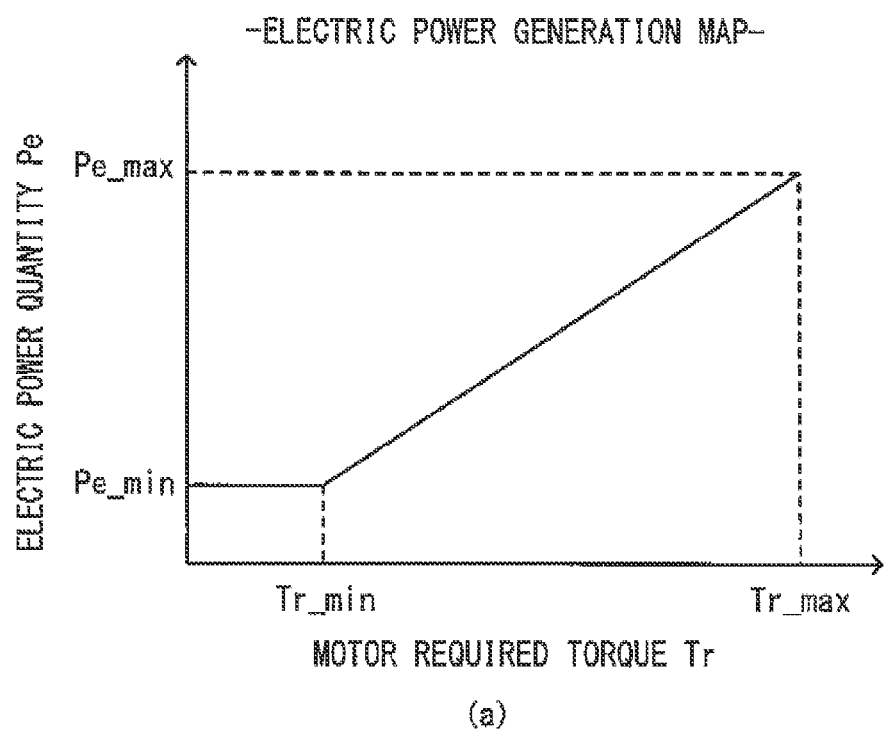
(a)
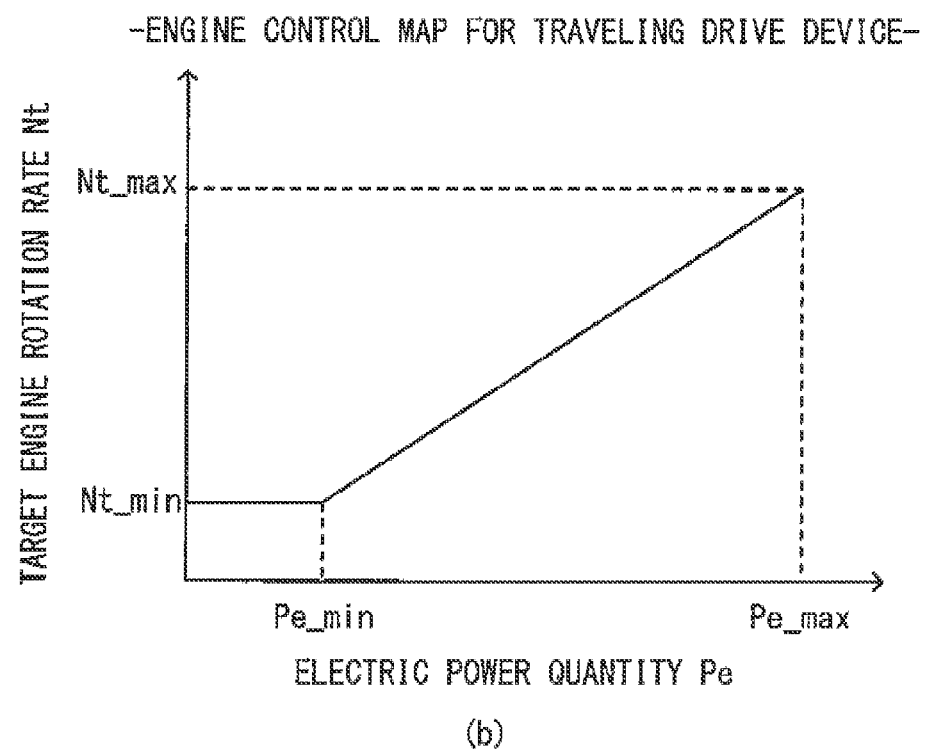
(b)

FIG. 9
—TILT CONTROL MAP FOR EXCAVATION WORK—
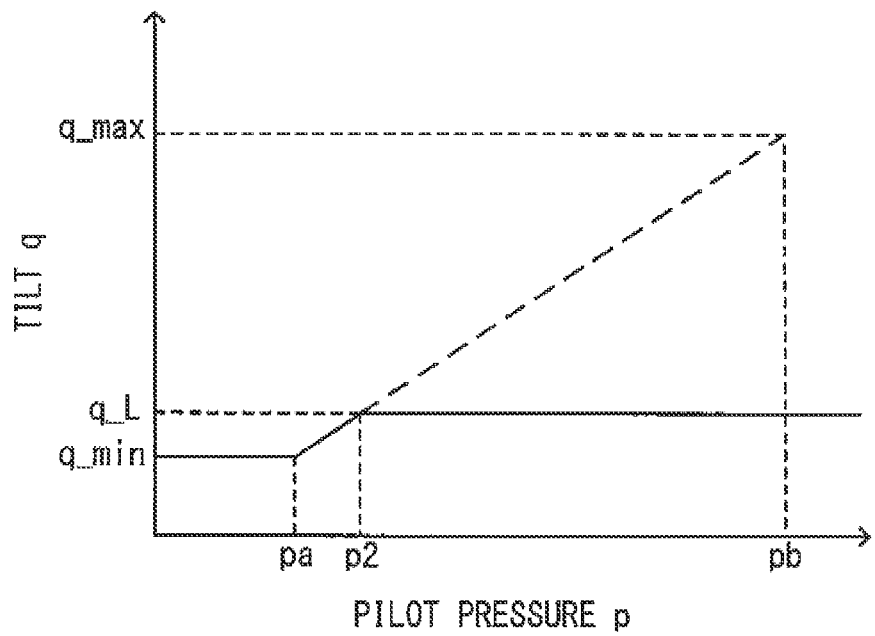
(a)
—TILT CONTROL MAP FOR COMBINATION OPERATION—
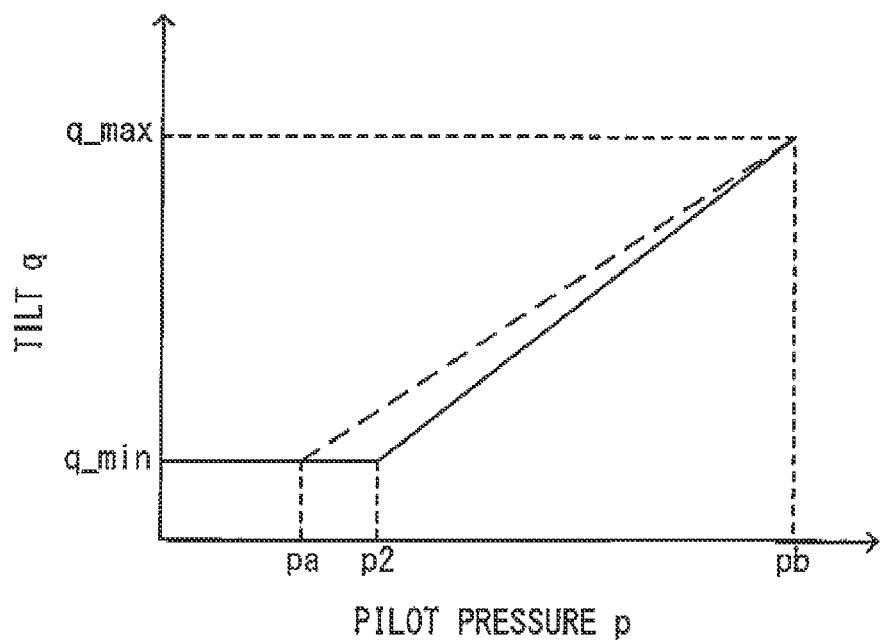
(b)

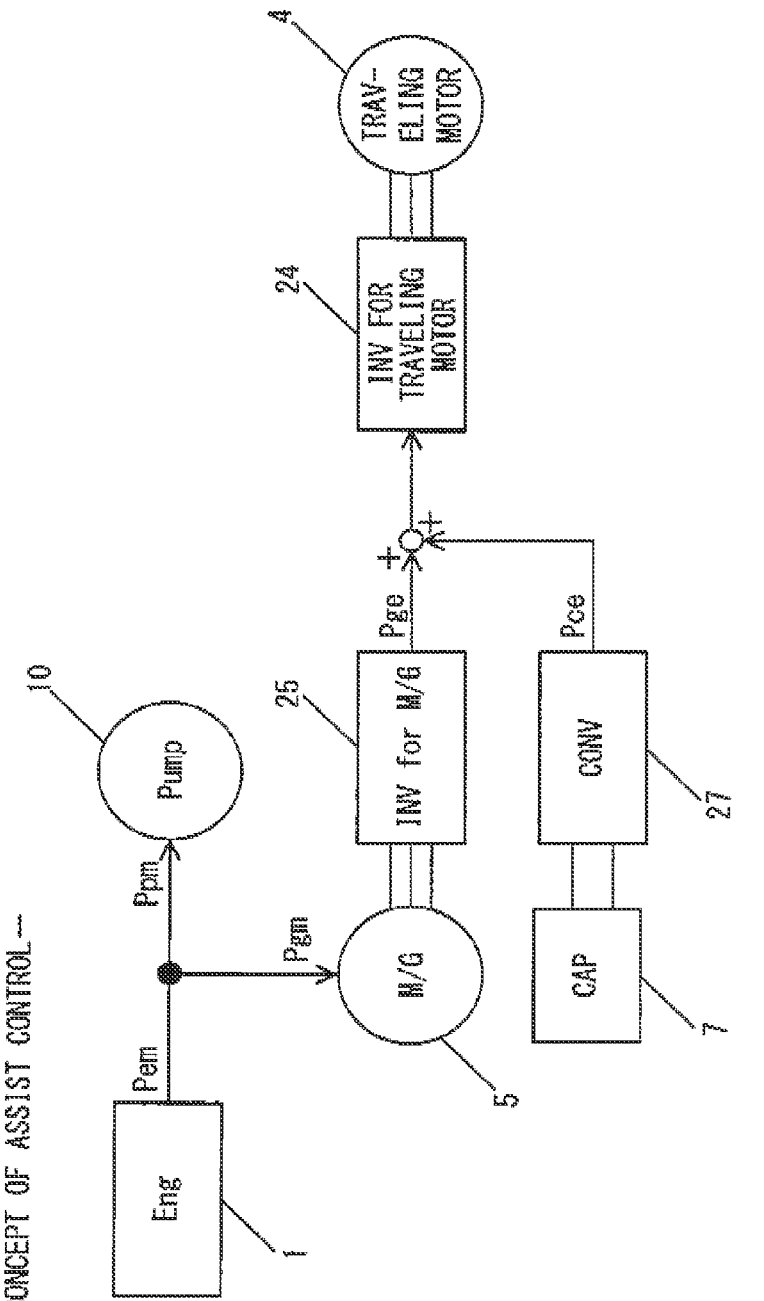

HYBRID WORK VEHICLE

TECHNICAL FIELD

The present invention relates to a hybrid work vehicle.

BACKGROUND ART

There is a wheel loader known in the related art equipped with a traveling drive device that transmits the rotation of an engine to the wheels via a torque converter (see patent literature 1). The wheel loader described in patent literature 1 is a work vehicle, the engine rotation rate of which is controlled in correspondence to the extent of accelerator pedal operation.

CITATION LIST

Patent Literature

Patent literature 1: International Publication WO2010/147232

SUMMARY OF INVENTION

Technical Problem

In a work vehicle such as a wheel loader, a work device or a traveling drive device may be operated alone or they may be operated in combination as the work vehicle is engaged in various types of work operations including excavation, loading and traveling operation. In a work vehicle equipped with a torque converter in the related art, such as the work vehicle disclosed in patent literature 1, the traveling load and the work load are borne directly by the engine, and for this reason, the engine is subjected to significant load fluctuations. Since an ample margin must be allowed for torque in consideration of such load fluctuations, a problem arises in that the engine rotation rate is higher when there is no work load, compared to the engine rotation rate corresponding to the traveling load.

Solution to Problem

According to the first aspect of the present invention, a hybrid work vehicle comprises: a work device that is driven with pressure oil provided from a hydraulic pump driven by an engine; a traveling drive device that is driven by a traveling motor driven with electric power; a lever operation quantity detection unit that detects a lever operation quantity of a control lever operated to control the work device; an engagement state detection unit that detects an engaged state and a non-engaged state of the work device; a pedal operation quantity detection unit that detects a pedal operation quantity of an accelerator pedal; a travel state detection unit that detects a traveling state and a non-traveling state of the traveling drive device; and an engine control unit that controls the engine rotation rate based upon at least either the lever operation quantity or the pedal operation quantity in correspondence to whether the engagement state detection unit has detected the engaged state or the non-engaged state and whether the travel state detection unit has detected the traveling state or the non-traveling state.

According to the second aspect of the present invention, in the hybrid work vehicle according to the first aspect, the hybrid work vehicle further comprises: a first rotating electric machine that is driven by the engine and generates first AC power; a first power conversion unit that converts the first AC power, generated by the first rotating electric machine, to first DC power; a power storage unit that outputs second DC power; a second power conversion unit that converts at least one of; the first DC power resulting from conversion by the first power conversion unit, and the second DC power output from the power storage unit, to second AC power; and a second rotating electric machine configuring the traveling motor, which is driven with the second AC power resulting from conversion by the second power conversion unit.

According to the third aspect of the present invention, in the hybrid work vehicle according to the first or the second aspect, when the engagement state detection unit detects the non-engaged state and the travel state detection unit detects the traveling state, the engine control unit controls the engine rotation rate based upon the pedal operation quantity; and, when the engagement state detection unit detects the engaged state and the travel state detection unit detects the non-traveling state, the engine control unit controls the engine rotation rate based upon the lever operation quantity.

According to the fourth aspect of the present invention, in the hybrid work device according to the second or the third aspect, the hybrid work vehicle further comprises: an assist/limit control unit that limits the first AC power based upon a level of the second DC power. If the engagement state detection unit detects the engaged state while the engine rotation rate is being controlled based upon the pedal operation quantity by the engine control unit upon detection of the traveling state by the travel state detection unit and detection of the non-engaged state by the engagement state detection unit, the second power conversion unit converts power representing a sum of the second DC power and the first DC power, to the second AC power.

According to the fifth aspect of the present invention, in the hybrid work vehicle according to any one of the second through fourth aspects, if the lever operation quantity detection unit detects the lever operation quantity equal to or greater than a predetermined value while the travel state detection unit detects the traveling state and the engagement state detection unit detects the non-engaged state, the engine control unit further raises the engine rotation rate relative to a target rotation rate based upon the pedal operation quantity.

According to the sixth aspect of the present invention, in the hybrid work vehicle according to any one of the second through fifth aspects, the hydraulic pump is a variable-capacity hydraulic pump a capacity of which can be adjusted by altering the tilt. The hybrid work vehicle further comprises: a tilt control unit that increases/decreases the tilt of the hydraulic pump in correspondence to the lever operation quantity; and a work state decision-making unit that makes a decision as to whether or not the hybrid work vehicle is engaged in excavation work. As the work state decision-making unit decides that the hybrid work vehicle is engaged in the excavation work, the tilt control unit limits the tilt to a predetermined value.

According to the seventh aspect of the present invention, in the hybrid work vehicle according to the sixth aspect, the work device includes an arm linked to a body so as to be allowed to rotate up/down and an arm cylinder that drives the arm; and the control lever outputs at least a raise command and a lower command for the arm. The hybrid work vehicle further comprises: an arm angle detection unit that detects an angle of the arm; and a forward/reverse command unit that outputs a forward command instructing the hybrid work vehicle to move forward and a reverse command instructing the hybrid work vehicle to move backward. When the raise command is output by the control lever, the forward command is output by the forward/reverse command unit and the arm angle detection unit detects that the angle is less than a predetermined value, the work state decision-making unit decides that the hybrid work vehicle is engaged in excavation work.

According to the eighth aspect of the present invention, in the hybrid work vehicle according to any one of the second through seven aspects, the travel state detection unit includes the pedal operation quantity detection unit, detects the traveling state if the pedal operation quantity detection unit detects the pedal operation quantity equal to or greater than a first predetermined value and detects the non-traveling state if the pedal operation quantity detection unit detects the pedal operation quantity less than the first predetermined value.

According to the ninth aspect of the present invention, in the hybrid work vehicle according to any one of the second through seventh aspects, the travel state detection unit includes a vehicle speed sensor that detects a vehicle speed, detects the traveling state if the vehicle speed sensor detects a vehicle speed equal to or greater than a predetermined speed and detects the non-traveling state if the vehicle speed sensor detects a vehicle speed less than the predetermined speed.

According to the tenth aspect of the present invention, in the hybrid work vehicle according to any one of the second through ninth aspects, the engagement state detection unit includes the lever operation quantity detection unit, detects the engaged state if the lever operation quantity detection unit detects a lever operation quantity equal to or greater than a second predetermined value and detects the non-engaged state if the lever operation quantity detection unit detects a lever operation quantity less than the second predetermined value.

According to the eleventh aspect of the present invention, in the hybrid work vehicle according to any one of the second through ninth aspect, the engagement state detection unit includes a pressure sensor that detects an output pressure of the hydraulic pump, detects the engaged state if the pressure sensor detects a pressure equal to or greater than a predetermined pressure and detects the non-engaged state if the pressure sensor detects a pressure less than the predetermined pressure.

Advantageous Effect of the Invention

According to the present invention, a hybrid work vehicle that enables efficient operation in correspondence to the work mode is provided.

BRIEF DESCRIPTION OF THE DRAWINGS

FIG. 5($a$) presents an electric power generation quantity map and FIG. 5($b$) presents an engine control map used in conjunction with the traveling drive device.

FIG. 9($a$) presents a tilt control map used for excavation work and FIG. 9($b$) presents a tilt control map used for combination operation.

FIG. 21 illustrates a method with which energy is distributed under assist control.

DESCRIPTION OF EMBODIMENTS

First Embodiment

An embodiment of the hybrid work vehicle according to the present invention will be described in reference to drawings.

Figure 1:
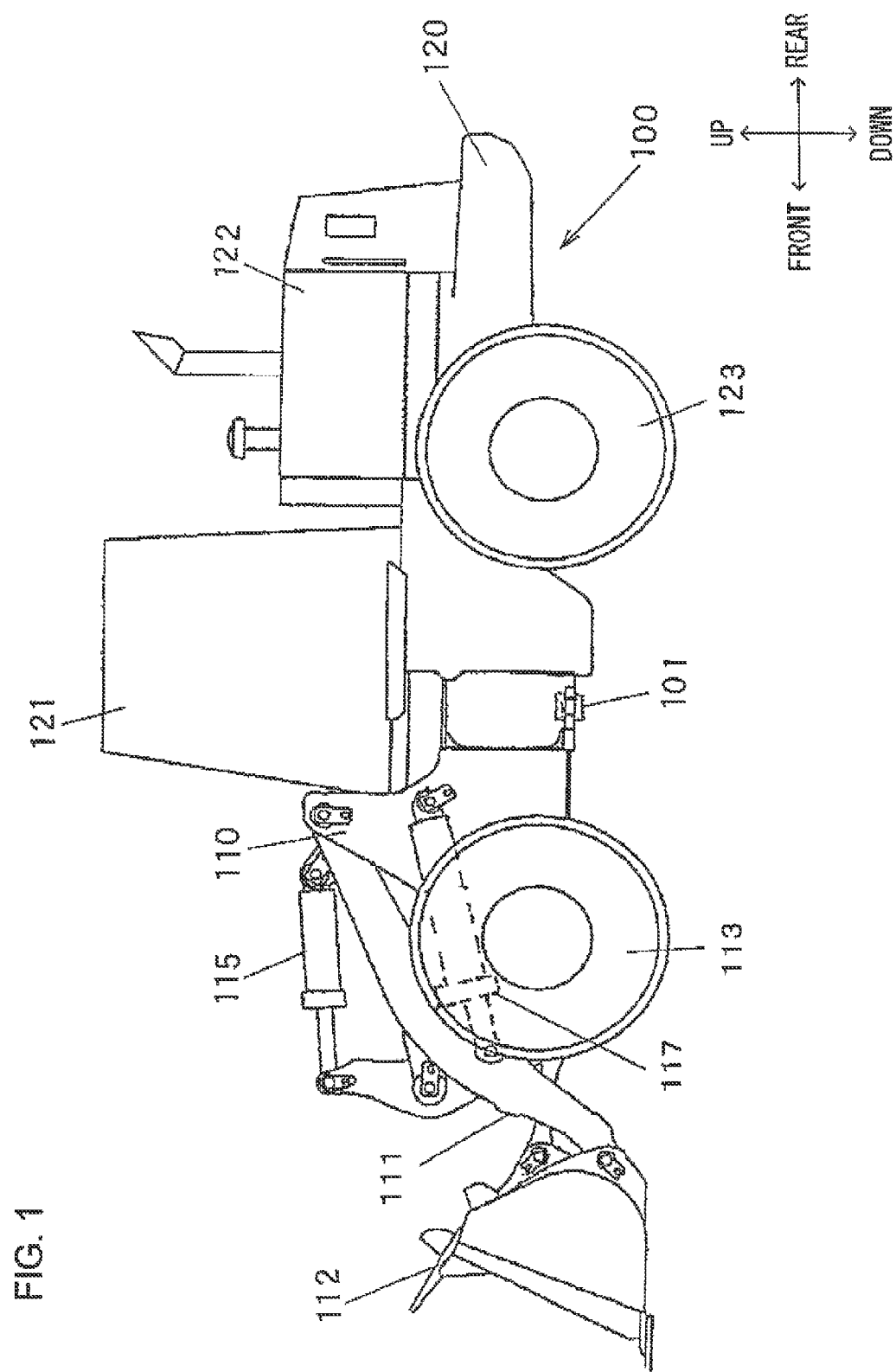
FIG. 1 is a side elevation of a wheel loader representing an example of the hybrid work vehicle according to the present invention.

FIG. 1 is a side elevation of a wheel loader 100 representing an example of the hybrid work vehicle according to the present invention. The wheel loader 100 includes a front body 110 and a rear body 120. An arm 111, a bucket 112, front wheels 113 and the like are disposed at the front body 110. An operator's cab 121, an engine compartment 122, rear wheels 123 and the like are disposed at the rear body 120.

The arm 111, linked to the front body 110 so as to be allowed to rotate up/down (articulate up/down) as it is driven by an arm cylinder 117. The bucket 112, linked to the front end of the arm 111 so as to be allowed to rotate up/down (engage in a digging operation or a dumping operation) as it is driven by a bucket cylinder 115. The front body 110 and the rear body 120 are connected with each other via a center pin 101 so as to articulate freely relative to each other. As a steering cylinder (not shown) extends/contracts, the front body 110 pivots to the left or to the right relative to the rear body 120 and thus, the front body 110 is steered.

An arm angle sensor 54 (see FIG. 2), which detects the rotational angle of the arm 111 relative to the front body 110, is disposed at a rotating portion of the arm 111. The arm angle sensor 54 may be, for instance, a rotary potentiometer.

Figure 2:
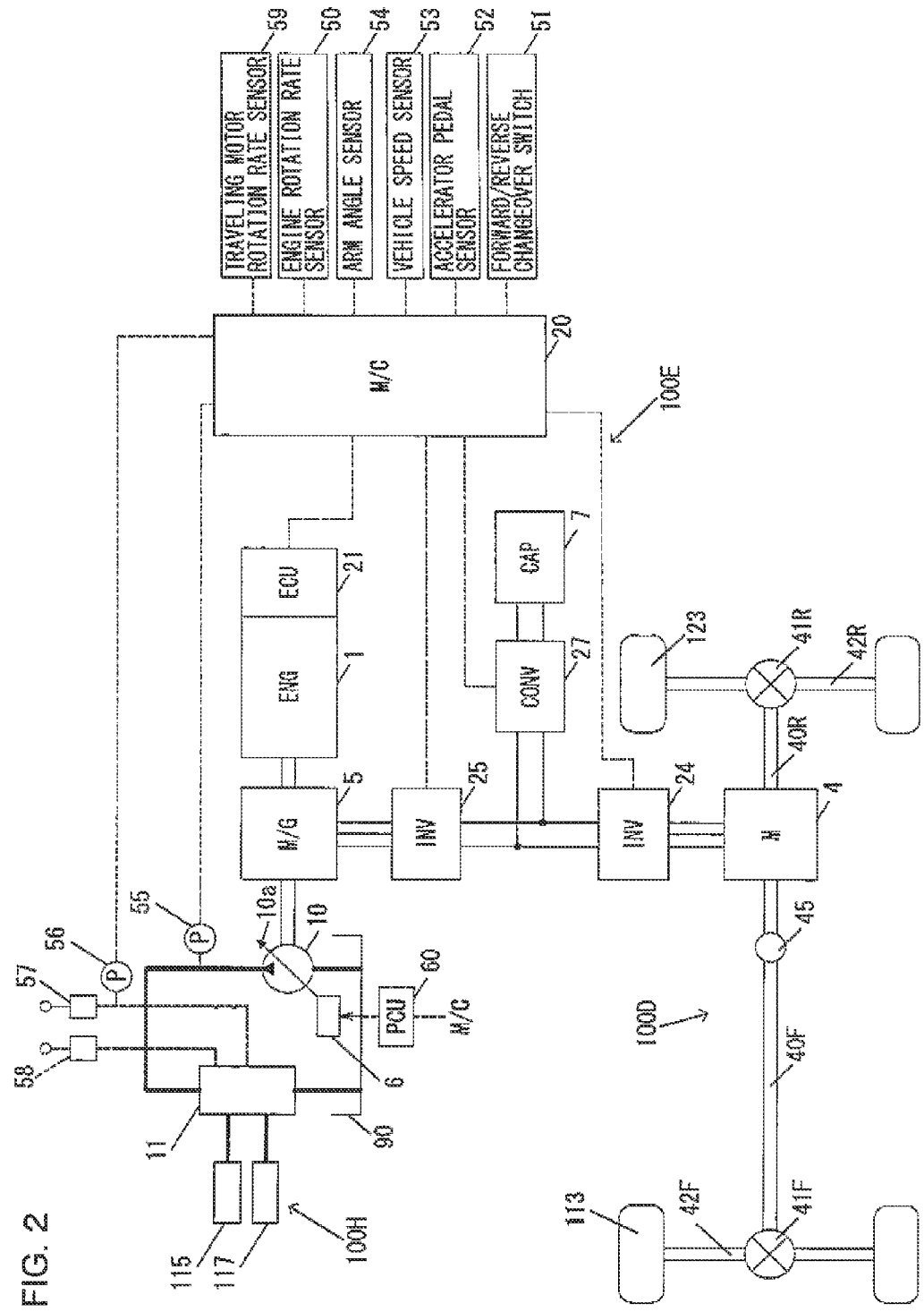
FIG. 2 presents an example of a structure that may be adopted in the wheel loader in an embodiment of the present invention.

FIG. 2 presents an example of a structure that the wheel loader 110 may adopt. The wheel loader 100 includes a min controller 20, and engine 1, an engine controller 21, a traveling dynamo electric device 100E, a hydraulic pump 10, a pump controller 60, a work device 100H and a traveling drive device 100D. The work device 100H may be, for instance, a hydraulic work device.

The work device 100H, which includes the arm 111 and the bucket 112 shown in FIG. 1 and the arm cylinder 117 and the bucket cylinder 115 shown in FIG. 2, is driven with pressure oil supplied from the hydraulic pump 10.

The hydraulic pump 10 is mechanically connected to the engine 1 and outputs pressure oil as it is driven by the engine 1. The hydraulic pump 10 is a variable capacity hydraulic pump, the capacity of which can be adjusted by varying the tilt angle of a swash plate 10a to be described later. The tilt angle of the swash plate 10a in the hydraulic pump 10 may be otherwise referred to as the tilt of the hydraulic pump 10 or the pump tilt. Hydraulic operating fluid in a tank 90 is supplied via the hydraulic pump 10 to the arm cylinder 117 and the bucket cylinder 115 via a control valve 11. The tilt angle can be adjusted with a regulator 6. By altering the pump output capacity through adjustment of the tilt angle of the hydraulic pump 10, the output flow rate relative to the rotation rate can be controlled.

As the pressure oil output from the hydraulic pump 10 is guided to the arm cylinder 117 and the bucket cylinder 115, which are hydraulic work actuators, via the control valve 11, the actuators are driven. The control valve 11 is controlled by a hydraulic signal or an electric signal output from an operation device such as a control lever, installed in the operator's cab 121. The hydraulic operating fluid supplied to the control valve 11 by the hydraulic pump 10 is distributed to the individual hydraulic actuators in correspondence to the operation of the operation device. Thus, the operator is able to control the extension/contraction of each hydraulic actuator simply by operating the corresponding control lever.

Operation devices disposed within the operator's cab 121 include an arm lever 57, which is a control lever operated to extend/contract the arm cylinder 117, a bucket lever 58, which is a control lever operated to extend/contract the bucket cylinder 115, a steering wheel (not shown) operated to extend/contract the steering cylinder (not shown) and the like. A forward/reverse changeover switch 51 operated to switch the traveling direction of the wheel loader 100 to forward or reverse, an accelerator pedal (not shown) and a brake pedal (not shown) are installed in the operator's cab 121.

Figure 3:
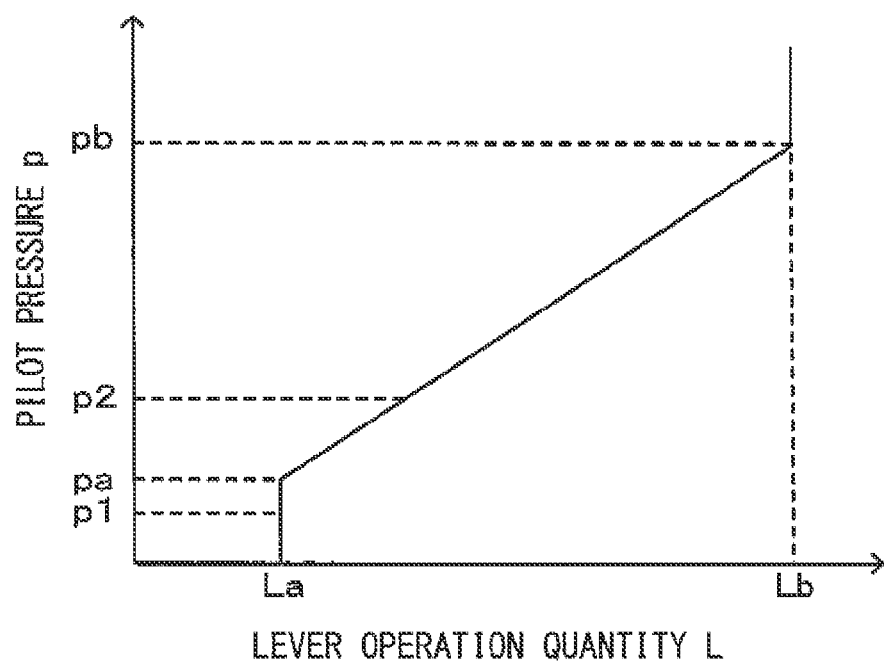
FIG. 3 is a diagram indicating the relationship between a lever operation quantity representing the extent to which the arm lever is operated and the pilot pressure.

The arm lever 57 is a control lever with which the arm 111 is operated, and a raise/lower command for the arm 111 is output from the arm lever 57. The arm lever 57 is a hydraulic pilot-type operation lever. As FIG. 3 indicates, a pilot pressure is output in correspondence to the lever operation quantity (lever stroke) representing the extent to which the arm lever 57 is operated. As long as the lever operation quantity L is less than a predetermined value La, the pilot pressure p does not increase. However, once the lever operation quantity L becomes equal to the predetermined value La, the pilot pressure p increases to a predetermined value pa.

While the lever operation quantity L stays within a range between the value La and a value Lb, the pilot pressure p increases in proportion to the lever operation quantity L. The bucket lever 58 is a hydraulic pilot-type operation lever similar to the arm lever 57, and a dig/dump command for the bucket 112 is output from the bucket lever 58.

As the steering cylinder (not shown) extends/contracts in response to operation of the steering wheel performed by the operator, the steering angle of the vehicle is adjusted and, as a result, the vehicle is caused to turn. As the operator operates the arm lever 57 and the bucket lever 58 and the arm cylinder 117 and the bucket cylinder 115 are caused to extend/contract by the operator, the height of the arm 111 and the inclination of the bucket 112 are controlled by the operator and thus, the wheel loader can be engaged in excavation and loading work by the operator.

As FIG. 2 indicates, the traveling dynamo-electric device 100E includes a motor/generator (M/G) 5, an M/G inverter 25, a traveling motor 4, a traveling inverter 24, power storage element 7 and a converter 27. The power storage element 7 may be, for instance, a capacitor. The traveling drive device 100D, which includes propeller shafts 40F and 40R, differential devices 41F and 41R, axles 42F and 42R, a pair of front wheels 113 and a pair of rear wheels 123, is driven by the traveling motor 4. The front wheel-side propeller shaft 40F and the rear wheel-side propeller shaft 40R are linked with each other via a universal joint 45.

The pair of front wheels 113 are each connected to the front wheel-side axle 42F. The front wheel-side axle 42F is linked to the front wheel-side propeller shaft 40F via the differential device 41F. The pair of rear wheels 123 are each connected to the rear wheel-side axle 42R. The rear wheel-side axle 42R is linked to the rear wheel side propeller shaft 40R via the differential device 41R. The traveling motor 4 is mounted on the axis of the rear wheel-side propeller shaft 40R.

The motor/generator 5, linked to the output shaft of the engine 1, functions as a power generator and generates three-phase AC power, when driven by the engine 1. This three-phase AC power is converted to DC power via the M/G inverter 25 and the DC power is supplied to the traveling inverter 24. When the charging rate of the power storage element 7 is down to a predetermined value, the DC power resulting from the conversion by the M/G inverter 25 is also provided to the power storage element 7 via the converter 27. The power storage element 7 is thus charged.

The M/G inverter 25 and the traveling inverter 24 convert DC power to AC power or AC power to DC power. The MG inverter 25 and the traveling inverter 24 are connected to the power storage element 7 via the converter 27. The converter 27 raises or lowers the charge/discharge voltage of the power storage element 7.

The power storage element 7 is an electric double-layer capacitor capable of storing power generated through a certain level of electric work (e.g., work over several seconds at several tens of kW) and discharging the stored charge with desired timing. The power storage element 7 is charged with DC power resulting from conversion at the traveling inverter 24 or the M/G inverter 25.

The DC power resulting from conversion at the M/G inverter 25 and/or DC power output from the power storage element 7 is converted to three-phase AC power by the traveling inverter 24. The traveling motor 4, driven with the three-phase AC power resulting from the conversion by the traveling inverter 24, generates rotational torque. The rotational torque generated at the traveling motor 4 is transmitted to the wheels via the traveling drive device 100D.

During a regenerative braking operation, the traveling motor 4 rotates with a rotational torque transmitted from the wheels and, as a result, three-phase AC power is generated. The three-phase AC power generated through the rotation of the traveling motor 4 is then converted to DC power by the traveling inverter 24 and is supplied to the power storage element 7 via the converter 27. The power storage element 7 is charged with the DC power resulting from the conversion by the traveling inverter 24.

The main controller 20 and the engine controller 21 each include an arithmetic processing device. The arithmetic processing devices each include a CPU, a ROM and a RAM used as storage devices, other peripheral circuits and the like. The main controller 20 executes control of the overall system including the traveling system and the hydraulic work system in the wheel loader 100. The main controller 20 controls the various units so as to enable the entire system to perform at the maximum level.

Signals output from the forward/reverse changeover switch 51, an accelerator pedal sensor 52, a vehicle speed sensor 53, the arm angle sensor 54, a pump pressure sensor 55, a pilot pressure sensor 56, an engine rotation rate sensor 50 and a traveling motor rotation rate sensor 59 are input to the main controller 20.

The forward/reverse changeover switch 51 outputs a forward command signal, carrying a command for the traveling drive device 100D to drive the wheel loader 100 forward, and a reverse command signal, carrying a command for the traveling drive device 100D to drive the wheel loader 100 in the reverse direction, to the main controller 20. The accelerator pedal sensor 52 detects the pedal operation quantity at the accelerator pedal (not shown) and outputs an acceleration signal indicating the pedal operation quantity at the accelerator pedal, to the min controller 20. The vehicle speed sensor 53 detects the vehicle speed of the wheel loader 100 and outputs a vehicle speed signal indicating the vehicle speed of the wheel loader 100, to the main controller 20. The arm angle sensor 54 detects the angle of the arm 111 and outputs an angle signal indicating the angle of the arm 111 to the main controller 20.

The pump pressure sensor 55 detects the output pressure of the hydraulic pump 10 and outputs a pump pressure signal, indicating the output pressure of the hydraulic pump 10, to the main controller 20. The pilot pressure sensor 56 detects a pilot pressure representing the lever operation quantity of the arm lever 57 and outputs a lever signal, indicating the pilot pressure, to the main controller 20. The wording "the pilot pressure sensor 56 outputting the lever signal" may be otherwise simply described as "the arm lever 57 outputting a command". The engine rotation rate sensor 50 detects the actual rotation rate of the engine 1 and outputs an actual rotation rate signal, indicating the actual rotation rate of the engine 1, to the main controller 20. The traveling motor rotation rate sensor 59 detects the rotation rate of the traveling motor 4 and outputs a motor rotation rate signal, indicating the rotation rate of the traveling motor 4, to the main controller 20.

Based upon the lever operation quantity of the control lever and/or the pedal operation quantity of the accelerator pedal (not shown), the main controller 20 sets a target rotation rate for the engine 1 that is optimal for the current work mode, and outputs a target rotation rate command, indicating the target rotation rate of the engine 1 having been set for the engine 1, to the engine controller 21.

The main controller 20 controls the engine 1 and the inverters 24 and 25 so that the traveling motor 4 outputs a required torque corresponding to, for instance, the pedal operation quantity of the accelerator pedal (not shown). The main controller 20 sets the target rotation rate of the engine 1 in order to have the motor/generator 5 generate the power required by the traveling motor 4, and outputs the target rotation rate command, indicating the target rotation rate of the engine 1 having been set to the engine controller 21.

Figure 4:
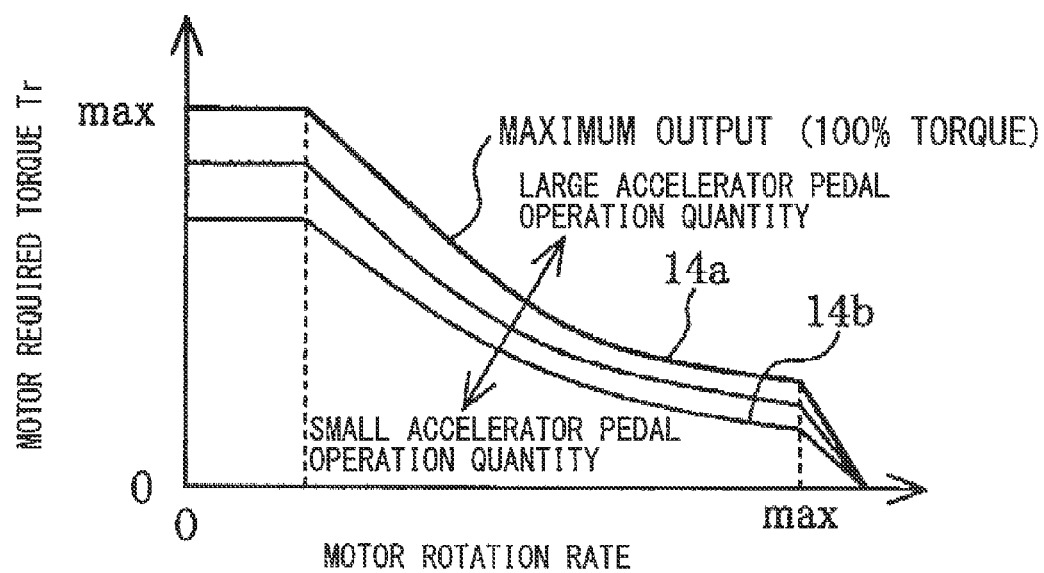
FIG. 4 presents a motor required torque map (motor characteristics).

The main controller 20 determines through arithmetic operation a motor required torque, which is a torque required by the traveling motor 4 during traveling operation. FIG. 4 presents a motor required torque map (motor characteristics). The motor required torque map indicates torque curves pertaining to the traveling motor 4. The motor required torque map is set so that the motor required torque Tr is in proportion to the acceleration signal and in reverse proportion to the rotation rate of the traveling motor 4. The motor required torque map is stored in a storage device within the main controller 20.

At the main controller 20, a relationship whereby the output of the traveling motor 4 increases/decreases in correspondence to an increase/decrease in the value indicated by the acceleration signal input thereto from the accelerator pedal sensor 52, is set for the acceleration signal and the output of the traveling motor 4. The main controller 20 determines the torque curve corresponding to the acceleration signal input thereto and determines the motor required torque Tr corresponding to the current rotation rate of the traveling motor 4 by referencing the torque curve.

For instance, in response to a full operation of the accelerator pedal, the main controller 20 determines the 100% characteristics in FIG. 4 for the maximum output of the traveling motor 4. Based upon the 100% maximum output characteristics and the current rotation rate of the traveling motor 4, the main controller 20 determines the motor required torque Tr corresponding to the current rotation rate. Based upon this motor required torque Tr, the main controller 20 generates a motor drive signal through a method of the known art and outputs the motor drive signal thus generated to the traveling inverter 24.

The main controller 20 determines through arithmetic operation the electric power generation quantity to be generated by the motor/generator 5. FIG. 5(*a*) presents an electric power generation quantity map. The electric power generation quantity map is set so that the electric power generation quantity Pe representing the electric power to be generated is in proportion to the motor required torque Tr over a motor required torque range within which Tr=Tr_min~Tr_max. The electric power generation map is stored in a storage device within the main controller 20. The main controller 20 references this electric power generation map and calculates the electric power generation quantity Pe based upon the motor required torque Tr having been calculated. The main controller 20 outputs an engine drive control signal generated based upon a target engine rotation rate to be described later, to the engine controller 21 so as to have the motor/generator 5 generate power in the electric power generation quantity Pe, having been calculated as described above, at. Together with the engine drive control signal output to the engine controller 21, the main controller 20 also outputs a drive signal, which is used to convert the three-phase AC power generated by the motor/generator 5 to DC power, to the M/G inverter 25. The electric power generation quantity Pe and the motor required torque Tr do not need to have a direct proportional relationship. They may instead assume, for instance, a proportional relationship represented by a quadratic curve or they may assume a relationship whereby they increase in steps.

The main controller 20 determines through arithmetic operation the target rotation rate of the engine 1 based upon the electric power generation quantity Pe having been calculated. FIG. 5(b) presents an engine control map used in conjunction with the traveling drive device. The engine control map for the traveling drive device is set so that the target engine rotation rate Nt is in proportion to the electric power generation quantity Pe over an electric power generation quantity range within which Pe=Pe_min~Pe_max. The engine control map for the traveling drive device is stored in a storage device within the main controller 20. The main controller 20 references this engine control map for the traveling drive device and calculates the target rotation rate Nt of the engine 1 based upon the electric power generation quantity Pe having been calculated. The main controller 20 outputs a signal indicating the target rotation rate Nt to the engine controller 21. The target rotation rate Nt of the engine 1 and the electric power generation quantity Pe do not need to have a direct proportional relationship. They may instead assume, for instance, a proportional relationship represented by a quadratic curve or they may assume a relationship whereby they increase in steps.

Figure 6:
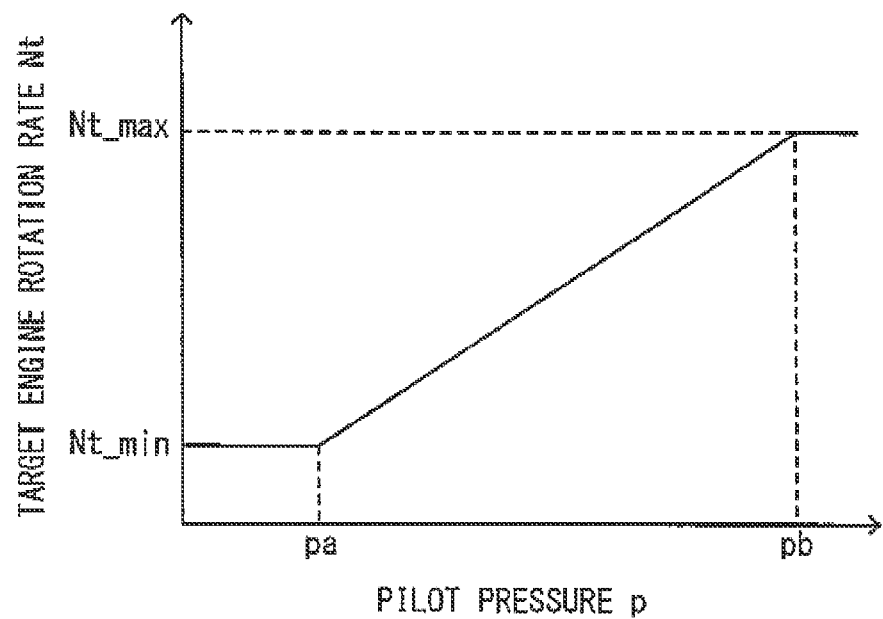
FIG. 6 presents an engine control map for the work device.

As described above, the engine rotation rate can be adjusted in response to an operation at the arm lever 57 in the embodiment. When the work device 100H alone is driven, the main controller 20 calculates the target rotation rate of the engine 1 in correspondence to the lever operation quantity L. FIG. 6 presents an engine control map for the work device. The engine control map for the work device is set so that the target engine rotation rate Nt, is in proportion to the pilot pressure p over a pilot pressure range within which p=pa~pb. The engine control map for the work device is stored in a storage device within the main controller 20. When the pilot pressure p is equal to pa, control is executed so as to hold the engine rotation rate at a minimum rotation rate Nt_min, whereas when the pilot pressure p is equal to ph, control is executed so as to raise the engine rotation rate to a maximum rotation rate Nt_max. The main controller 20 references this engine control map for the work device and calculates the target rotation rate Nt of the engine 1 based upon the pilot pressure p indicated in the lever signal input thereto. The main controller 20 outputs a signal indicating the target engine rotation rate Nt to the engine controller 21. The target engine rotation rate Nt and the pilot pressure p do not need to have a direct proportional relationship. They may instead assume, for instance, a proportional relationship represented by a quadratic curve or they may assume a relationship whereby they increase in steps.

The wheel loader 100 is engaged in combination work. For instance, it raises the arm 111 or performs excavation work while traveling. In such a situation, the operator operates the control lever while stepping on the accelerator pedal so as to engage both the traveling drive device 100D and the work device 100H at the same time. In order to drive the traveling drive device 100D and the work device 100H, the main controller 20 determines through arithmetic operation a target rotation rate Nt of the engine 1 based upon the pedal operation quantity of the accelerator pedal and the lever operation quantity of the control lever. An engine rotation rate correction map to be used for combination work is stored in a storage device at the main controller 20.

Figure 7:
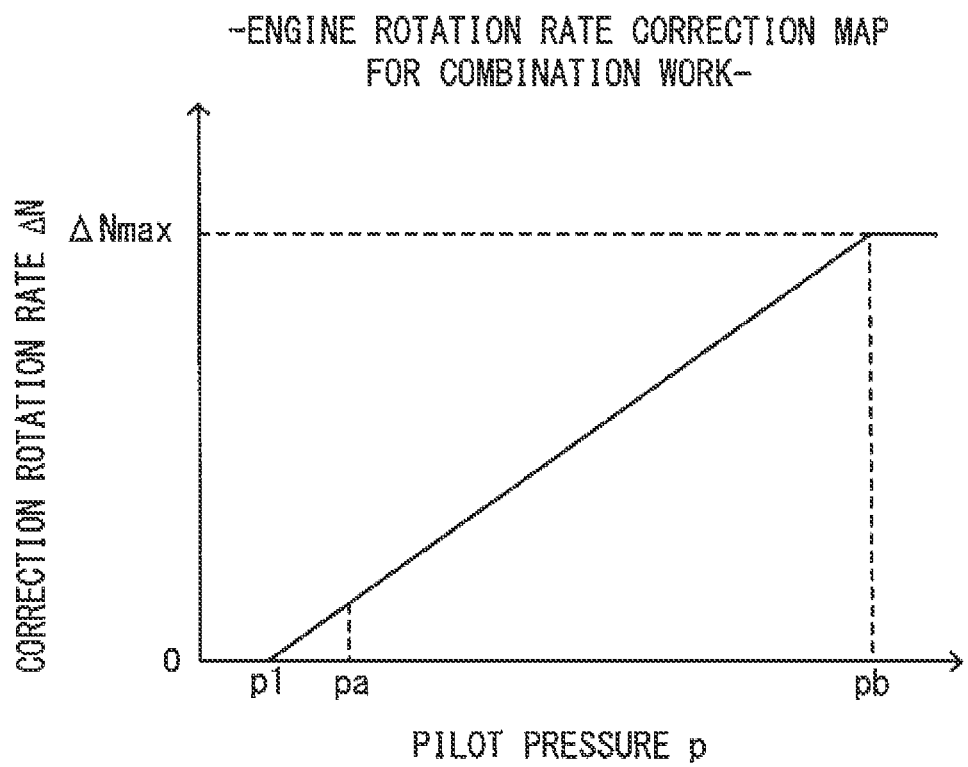
FIG. 7 presents an engine rotation rate correction map used for combination work.

FIG. 7 presents the engine rotation rate correction map used for combination work. The engine rotation rate correction map for combination work is set so that a correction rotation rate ΔN is in proportion to the pilot pressure p over a pilot pressure range within which p=p1~pb. Namely, the engine rotation rate correction map for combination work is set so that the engine rotation rate increases as the pilot pressure p takes on greater values relative to a predetermined value p1. When the traveling drive device 100D and the work device 100H are engaged in combination operation, the main controller 20 calculates a target engine rotation rate Ntc by adding a correction rotation rate ΔN to the target engine rotation rate Nt (Ntc=Nt+ΔN), and outputs a signal indicating the corrected target engine rotation rate Ntc thus obtained to the engine controller 21. The pre-correction target engine rotation rate Nt is calculated based upon the electric power generation quantity Pe, by referencing the engine control map for the traveling drive device presented in FIG. 5(b)). A correction rotation rate ΔN is calculated based upon the pilot pressure p, by referencing the engine rotation rate correction map for combination work presented in FIG. 7. A correction rotation rate ΔN and the pilot pressure p do not need to have a direct proportional relationship. They may instead assume, for instance, a proportional relationship represented by a quadratic curve or they may assume a relationship whereby they increase in steps.

The engine controller 21 compares the actual rotation rate Na of the engine detected by the engine rotation rate sensor 50 with the target engine rotation rate Nt or the corrected target engine rotation rate Ntc output by the main controller 20, and controls the fuel injection device (not shown) so as to adjust the actual engine rotation rate Na close to the target engine rotation rate Nt or the corrected target engine rotation rate Ntc.

The main controller 20 executes charge/discharge control for the power storage element 7 so as to sustain the charging rate (i.e., SOC: state of charge) of the power storage element 7 within a predetermined range.

Based upon the arm angle signal input thereto and an arm angle threshold value stored in a storage device, the main controller 20 makes a decision as to whether or not the angle of the arm 111 is less than the threshold value. Deciding whether or not the angle of the arm 111 is less than the threshold value is equivalent to making a decision as to whether or not the height of the arm 111 is less than a predetermined height measured from the travelling surface. The arm angle threshold value may represent a rotational angle assumed by the arm 111 when the arm 111 is, for instance, approximately 300 mm above the travelling surface. As an alternative, a decision as to whether or not the height of the arm 111, calculated based upon geometric information pertaining to the wheel loader 100, stored in a storage device at the main controller 20, and the angle detected by the arm angle sensor 54, is less than a predetermined value may be made.

Figure 8:
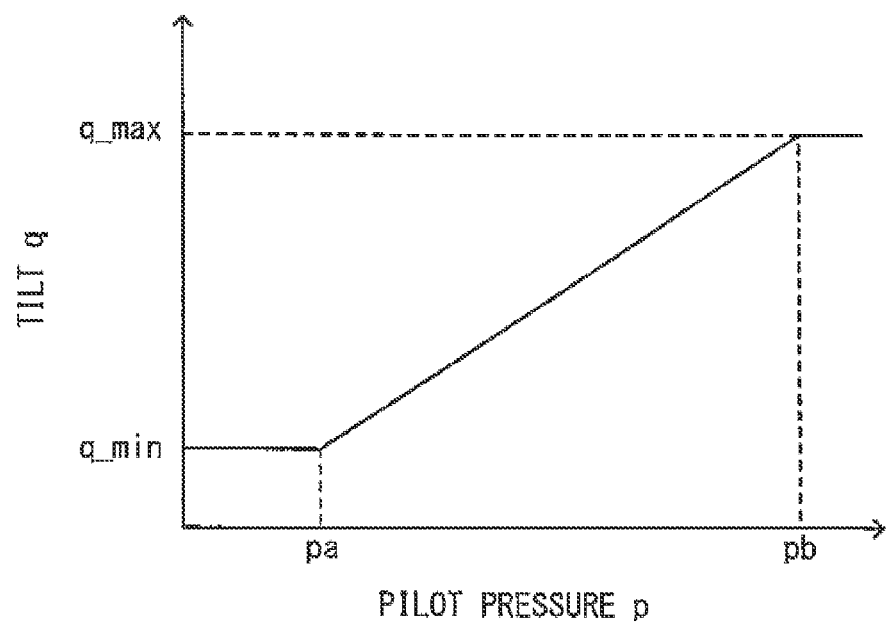
FIG. 8 presents a tilt control map used for work device solo operation.

In correspondence to the current work mode, the main controller 20 selects one of a plurality of tilt control maps set in advance, and determines through arithmetic operation a target tilt q of the hydraulic pump 10 based upon the pilot pressure p by referencing the selected tilt control map. FIG. 8 presents a tilt control map to be used for work device solo operation. The tilt control map for work device solo operation is set so that the tilt q is in proportion to the pilot pressure p over a range within which the pilot pressure p indicated in the lever signal is between pa and pb. The tilt control map for work device solo operation is stored in a storage device within the main controller 20.

A pilot pressure p that is equal to pa corresponds to the minimum lever operation quantity La set by taking into consideration the dead zone of the control lever. When the pilot pressure p is equal to or greater than the predetermined value pa, the control valve 11 is switched. A pilot pressure p that is equal to pb corresponds to the maximum lever operation quantity Lb of the control lever (see FIG. 3).

FIG. 9(a) presents a tilt control map for excavation work. The term "excavation work" is used to refer to work of the wheel loader performed by scooping up dirt when driving the wheel loader 100 into dirt and digging dirt with the bucket 112. The tilt control map for excavation work is set so that the tilt q is in proportion to the pilot pressure p over a range within which the pilot pressure p, indicated by the lever signal, is between pa and p2. The tilt control map for excavation work is stored in a storage device within the main controller 20.

As FIG. 9(a) indicates, when the control lever is operated with a lever stroke with the pilot pressure p exceeding the predetermined value p2, the tilt q takes on a constant value q_L. In this situation, restrictions are imposed on the input torque of the hydraulic pump 10, since priority must be given to assuring tractive force when the bucket 112 is driven into dirt to scoop up dirt by moving the wheel loader 100 forward.

FIG. 9(b) presents a tilt control map used for combination operation. The term "combination operation" is used in this context to refer to a combination operation which does not include the excavation work described above, e.g., an operation of the wheel loader 100 to travel raising the arm 111 of the wheel loader 100. The tilt control map for combination operation is set so that the tilt q is in proportion to the pilot pressure p over a range within which the pilot pressure p, indicated by the lever signal, is between p2 and pb. The tilt control map for combination operation is stored in a storage device within the main controller 20.

The signal (lever signal) indicating the pilot pressure is output by the pump controller 60 as a target drive current to the regulator 6. The regulator 6 adjusts the tilt of the hydraulic pump 10. The tilt of the hydraulic pump 10 corresponds to the output volume. The following is a detailed description of the tilt control achieved by the pump controller 60 and the regulator 6, given in reference to the particular instance of tilt control executed based upon the tilt control map for work device solo operation presented in FIG. 8.

Figure 10:
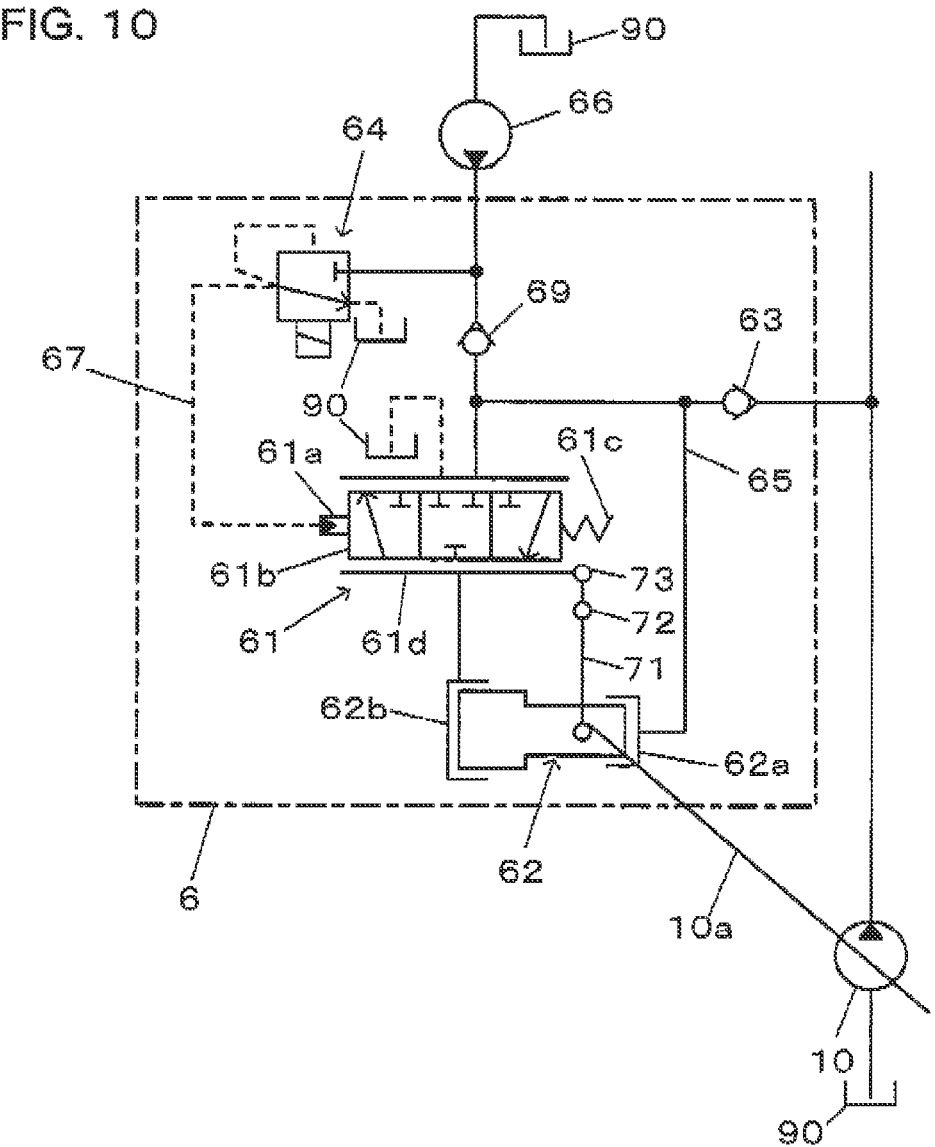
FIG. 10 is a detailed diagram pertaining to the regulator.

FIG. 10 shows the regulator 6 in detail. The regulator 6 controls the tilt angle of the hydraulic pump 10 based upon the target drive current i0 output by the pump controller 60 so that the tilt angle is adjusted to match a target pump tilt angle corresponding to the target drive current i0. The regulator 6 includes an electromagnetic proportional pressure-reducing valve 64, a servo valve 61 and a servo piston 62. As the target drive current i0 output by the pump controller 60 is input to the electromagnetic proportional pressure-reducing valve 64, the electromagnetic proportional pressure-reducing valve 64 outputs a command pressure that is in proportion to the target drive current i0 to the servo valve 61. The servo valve 61 is engaged in operation with the command pressure so as to control the position of the servo piston 62. The servo piston 62 drives the swash plate 10a at the hydraulic pump 10 to control the tilt angle thereof.

The output pressure of the hydraulic pump 10 is guided to an input port of the servo valve 61 via a check valve 63 and is also constantly in action on a small diameter chamber 62a of the servo piston 62 via a passage 65. As the output pressure from a pilot pump 66 is guided to an input port of the electromagnetic proportional pressure-reducing valve 64 and the electromagnetic proportional pressure-reducing valve 64 is thus engaged in operation, the output pressure, having been guided to the electromagnetic proportional pressure-reducing valve 64, is reduced and the resulting lowered pressure is used as a command pressure. This command pressure is communicated through a passage 67 and acts on a pilot piston 61a of the servo valve 61. If the output pressure from the hydraulic pump 10 is lower than the output pressure from the pilot pump 66, the output pressure from the pilot pump 66, now to be used as a servo assistance pressure, is guided to the input port of the servo valve 61 via a check valve 69.

Figure 11:
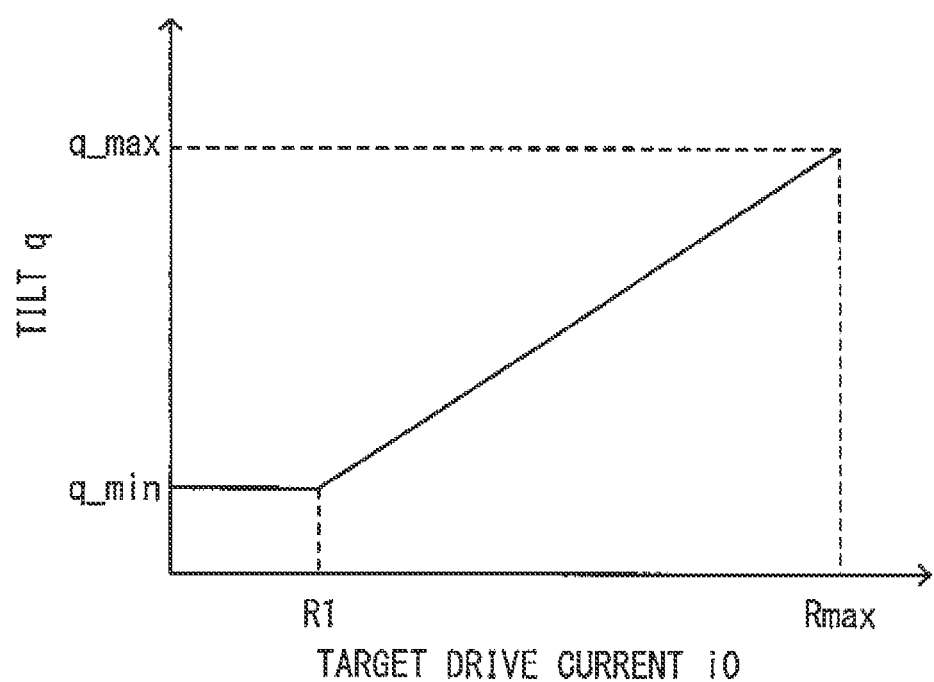
FIG. 11 is a graph indicating a relationship that may be assumed for the target drive current and the pump tilt.

FIG. 11 indicates a relationship that may be assumed for the target drive current i0 provided to the electromagnetic proportional pressure-reducing valve 64 and the tilt angle assumed by the stash plate 10a in the hydraulic pump 10. The relationship indicated in FIG. 11 corresponds to the tilt control map presented in FIG. 8.

As long as the target drive current i0 is equal to or less than a value R1, the electromagnetic proportional pressure-reducing valve 64 remains disengaged and the command pressure output from the electromagnetic proportional pressure-reducing valve 64 is 0. In this state, a spool 61b of the servo valve 61 is pushed to the left in FIG. 10, by a spring 61c. Under these circumstances, the output pressure from the hydraulic pump 10 or the output pressure from the pilot pump 66) travels through the check valve 63, a sleeve 61d and the spool 61b and acts on a large diameter chamber 62b of the servo piston 62. While the output pressure from the hydraulic pump 10 is also acting at the small diameter chamber 62a in the servo piston 62 via the passage 65, the servo piston 62 is displaced to the right in FIG. 10, due to the area difference.

As the servo piston 62 moves to the right in FIG. 10, a feedback lever 71 rotates on a fulcrum formed at a pin 72 along the counterclockwise direction in FIG. 10. Since the front end of the feedback lever 71 is linked with the sleeve 61d at the pin 73, the sleeve old becomes displaced to the left in FIG. 10. The displacement of the servo piston 62 continues until communication between an opening portion at the sleeve 61d and a notch formed at the spool 61b becomes cut off, and once they are completely cut off from each other the servo piston 62 comes to a stop.

Through this sequence, the tilt angle of the hydraulic pump 10 is adjusted to achieve a minimum value qmin, resulting in the minimum flow rate for the output from the hydraulic pump 10.

As the target drive current i0 becomes greater than the value R1 in the graph presented in FIG. 11 and the electromagnetic proportional pressure-reducing valve 64 becomes engaged, a command pressure, which corresponds to the extent to which the electromagnetic proportional pressure-reducing valve 64 is operated, is applied to the pilot piston 61a of the servo valve 61 through the passage 67. In this situation, the spool 61b moves to the right in FIG. 10, to a position at which a balance with the force imparted from the spring 61c is achieved. The displacement of the spool 61b causes the large diameter chamber 62b of the servo piston 62 to become connected with the tank 90 via a passage formed inside the school 61b. Since the output pressure from the hydraulic pump 10 (or the output pressure from the pilot pump 66), provided via the passage 65, acts at all times on the small diameter chamber 62a of the servo piston 62, the servo piston 62 moves to the left in FIG. 10, and the hydraulic operating fluid in the large diameter chamber 62b is allowed to travel back into the tank 90.

As the servo piston 62 moves to the left in FIG. 10, the feedback lever 71 rotates on the fulcrum formed at the pin 72 along the clockwise direction in FIG. 10, and the sleeve 61d of the servo valve 61 becomes displaced to the right in FIG. 10. The displacement of the servo piston 62, continues until communication between the opening portion at the sleeve 61d and the notch formed at the spool 61b becomes cut off, and once they are completely cut off from each other the servo piston 62 comes to a stop.

Through this sequence, the tilt angle at the hydraulic pump 10 is increased, which results in an increase in the flow rate of the output from the hydraulic pump 10. The flow rate of the output from the hydraulic pump 10 increases in proportion to the extent to which the command pressure rises, i.e., the extent to which the target drive current i0 increases.

As the target drive current i0 decreases and the command pressure output from the electromagnetic proportional pressure-reducing valve 64 becomes lower, the spool 61b of the servo valve 61 is caused to move back toward the left in FIG. 10, until it reaches the position at which a balance with the force imparted from the spring 61c is achieved. The output pressure from the hydraulic pump 10 (or the output pressure from the pilot pump 66), provided through the sleeve 61d and the spool 61b of the servo valve 61, acts on the large diameter chamber 62b of the servo piston 62, and the servo piston 62 is caused to move to the right in FIG. 10, due to the difference between the area of the large diameter chamber 62b and the area of the small diameter chamber 62a.

As the servo piston 62 moves to the right in FIG. 10, the feedback lever 71 rotates on the fulcrum formed at the pin 72 along the counterclockwise direction in FIG. 10, and the sleeve 61d of the servo valve 61 becomes displaced to the left in FIG. 10. The displacement of the servo piston 62 continues until communication between an opening portion at the sleeve 61d and a notch formed at the spool 61b becomes cut off, and once the communication is completely cut off, the servo piston 62 comes to a stop.

Through this sequence, the tilt angle at the hydraulic pump 10 is decreased, which results in a decrease in the flow rate of the output from the hydraulic pump 10. The flow rate of the output from the hydraulic pump 10 decreases in proportion to the extent to which the command pressure falls, i.e., the extent to which the target drive current i0 decreases.

Figure 12:
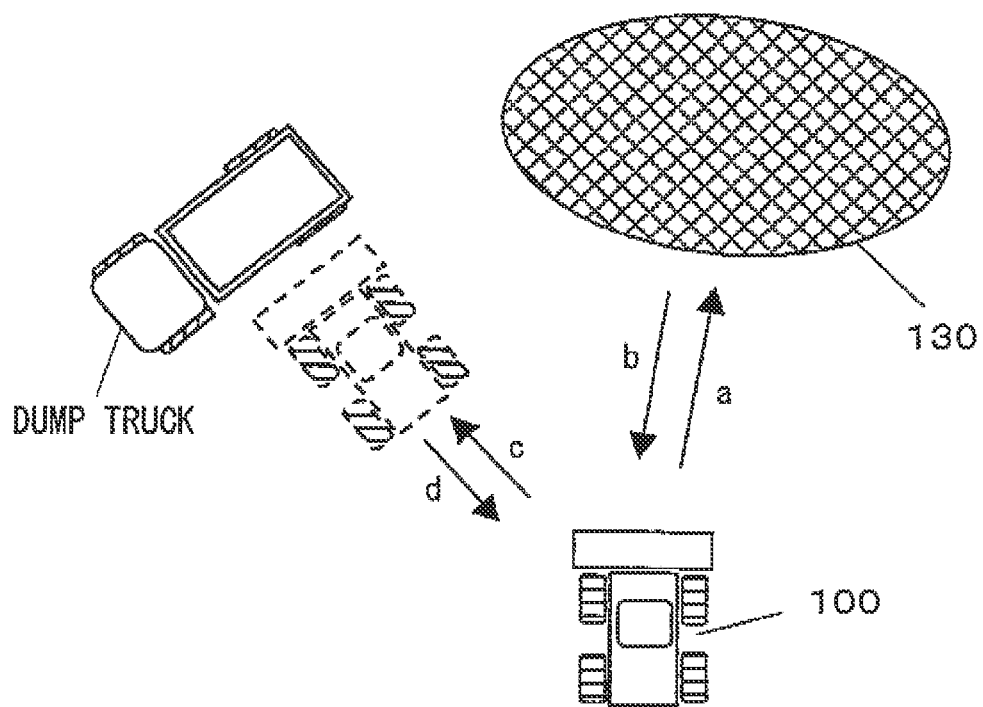
FIG. 12 illustrates V-shape loading, which is one of the methods that may be adopted when loading dirt or the like into a dump truck.

FIG. 12 illustrates how a V-shape loading operation, representing a method that may be adopted when loading dirt or the like into a dump truck, is performed. In the V-shape loading operation, the wheel loader 100 is caused to advance forward, as indicated by an arrow a in order to scoop up dirt or the like.

Figure 13:
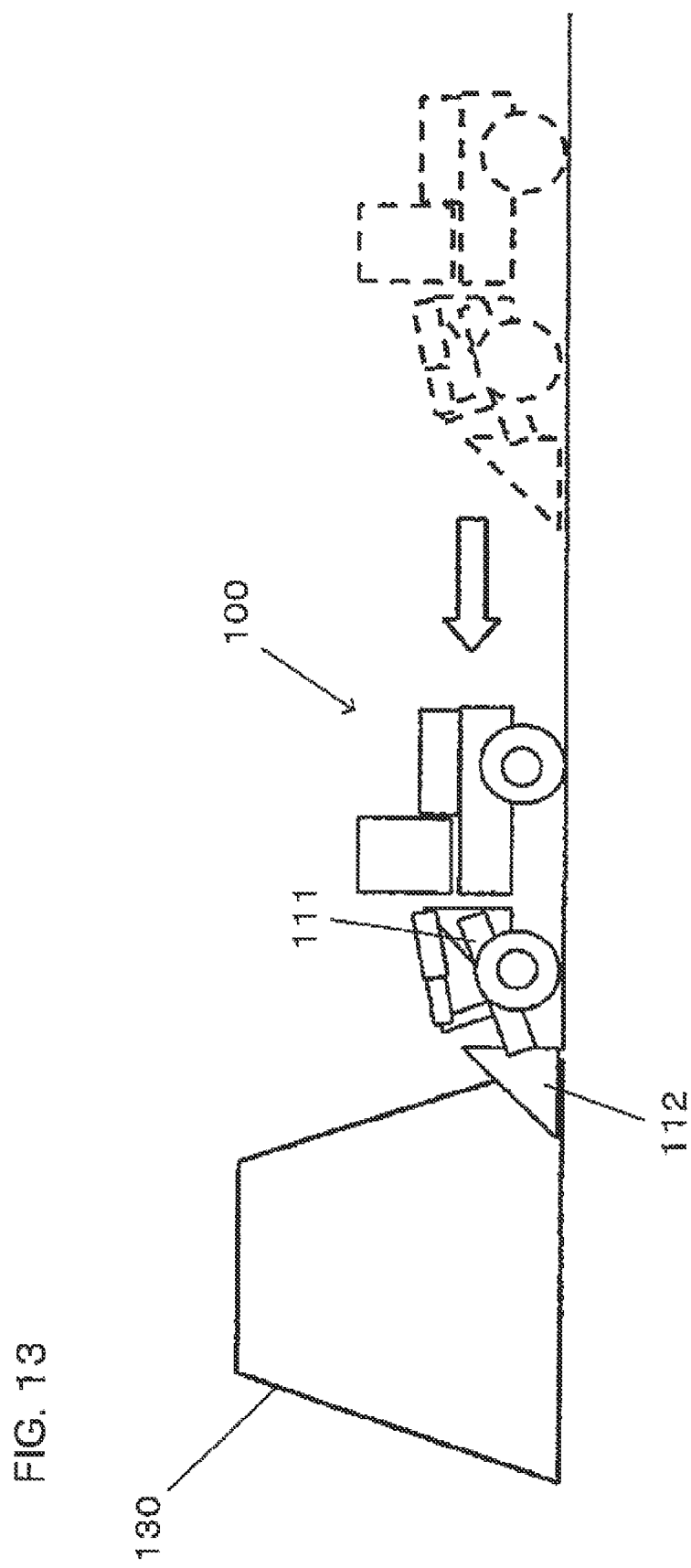
FIG. 13 illustrates excavation work performed by a wheel loader.

The operator of the wheel loader 100 engaged in dirt scooping work, i.e., in the excavation work described earlier, normally drives the bucket 112 into a mound 130 of dirt or the like, as illustrated in FIG. 13, and manipulates the bucket 112 before raising the arm 111, or simultaneously manipulates the bucket 112 and the arm 111 before raising the arm 111 alone.

Once the particular excavation is completed, the wheel loader 100 backs away, as indicated by an arrow b FIG. 12. In this embodiment, the particular excavation is judged to be completed when the operator has switched to "reverse" at the forward/reverse changeover switch 51. Then, as indicated by an arrow c, the wheel loader 100 advances forward towards a dump truck and stops in front of the dump truck.

Figure 14:
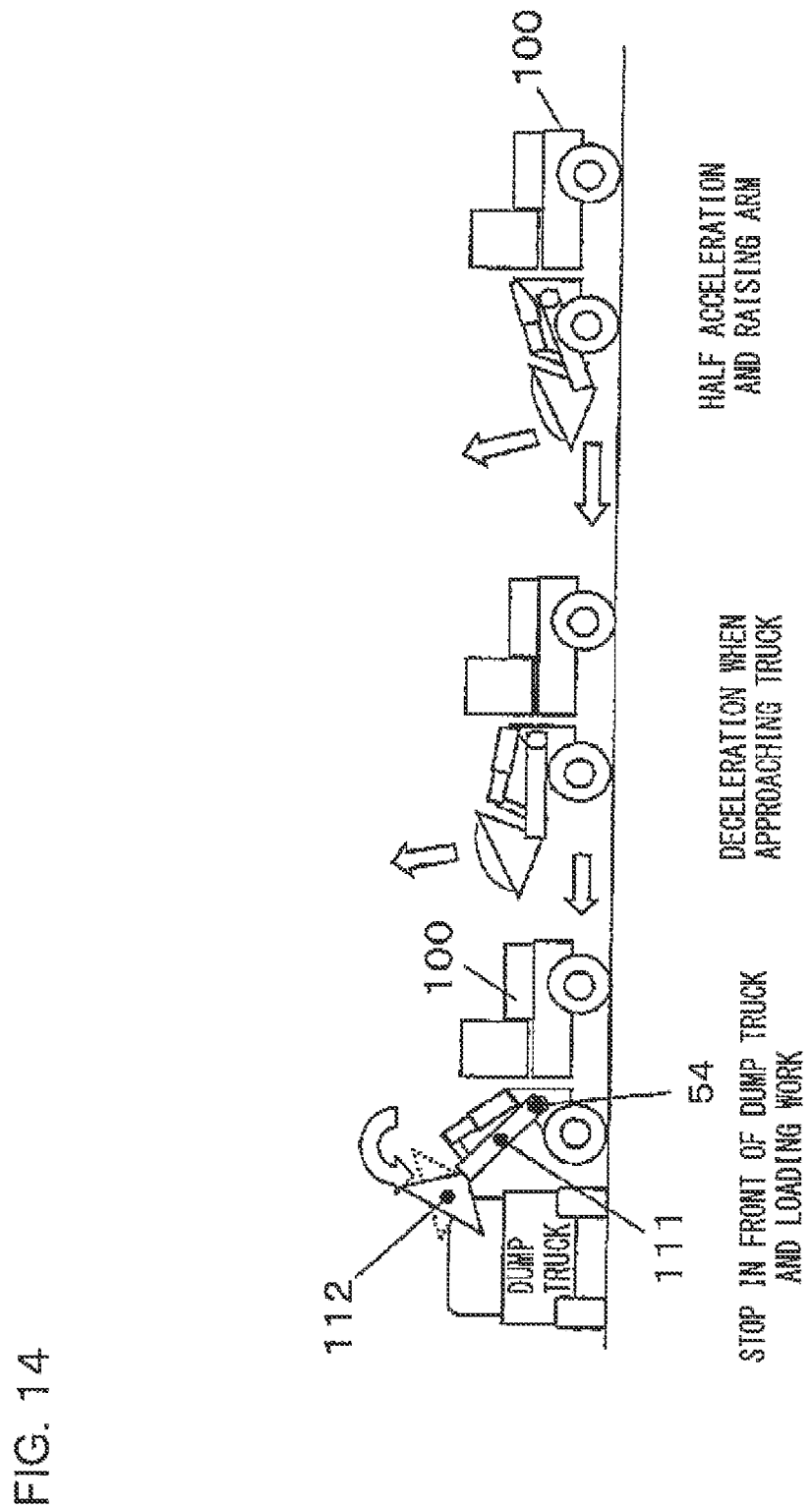
FIG. 14 illustrates transportation work and loading work performed by a wheel loader.

As the wheel loader 100 travels forward toward the dump truck, the arm 111 is raised, as illustrated in FIG. 14. If the bucket 112 has already been moved up to the loading height when the wheel loader 100 comes to a stop before the dump truck, the dirt or the like having been scooped into the bucket 112 can be immediately emptied into the dump truck. For this reason, it is desirable that an optimal speed with which the arm 111 is raised be assured while the wheel loader 100 travels forward toward the dump truck. Accordingly, the combination operation described earlier is performed in this situation.

The embodiment allows the operator to adjust the load distribution between the traveling drive device 100D and the work device 100H. This means that the operator may press the accelerator pedal only halfway down (half acceleration) and keep the arm lever 57 in an electromagnetic hold (detent lock) at a raise position, so as to give higher priority to the hydraulic work system over the traveling system. Through these measures, the work efficiency can be improved, since the arm 111 can be raised with the optimal speed while the wheel loader 100 travels forward so as to ensure that when the wheel loader 100 reaches a point in front of the dump truck, the bucket 112 will have already been raised to the loading height.

Once the particular load is completed, the wheel loader 100 backs out to the initial position, as indicated by an arrow d in FIG. 12. The description provided above covers the basic operational flow of the loading method using the V-shape loading.

FIG. 15 through FIG. 20 each present a flowchart of an example of operation processing that may be executed by the main controller 20. The processing executed as shown in the flowcharts is initially started up as, for instance, an engine key switch (not shown) is turned on. It is to be noted that the following description will only relate to the aspect of the hydraulic work performed when the arm lever 57 alone has been operated and that no illustration or description of the SOC control will be provided.

Figure 15:
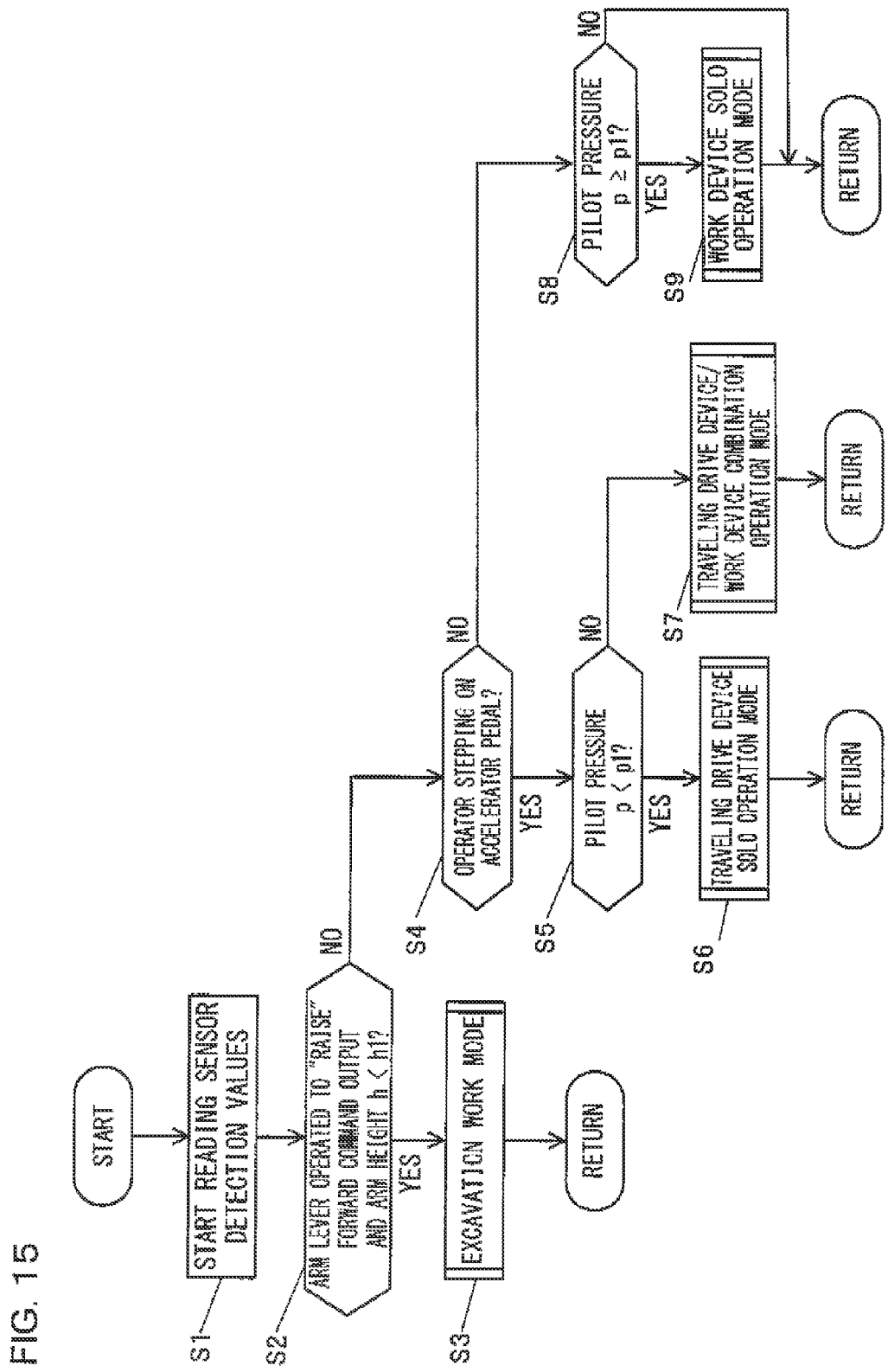
FIG. 15 presents a flowchart of an example of operation processing that may be executed by the main controller.

As shown in FIG. 15, in step S1, the main controller 20 reads the signals provided from the various sensors, levers and switches. The main controller 20 determines the current work mode of the wheel loader 100 based upon the detection values having been read, and controls the drive of various units such as the engine 1, the traveling motor 4 and/or the hydraulic pump 10 in correspondence to the work mode.

The main controller 20 makes a decision as to which one of the following states is the current state of the wheel loader 100: a state in which the work device 100H alone is being driven, a state in which the traveling drive device 100D alone is being driven, and a combination operation state in which the work device 100H and the traveling drive device 100D are both being driven. The main controller 20 in the embodiment makes a separate decision with regard to an excavation work state, which is also a combination operation state.

In step S2, the main controller 20 makes a decision as to whether or not excavation work is underway. Namely, the main controller 20 makes a decision as to whether or not the following conditions are all satisfied: the arm lever 57 has been operated to the electromagnetic hold position "raise" resulting in a raise command for the arm 111 output from the arm lever 57, the forward/reverse changeover switch 51 has been operated to the forward position resulting in a forward command for the traveling drive device 100D output from the forward/reverse changeover switch 51, and the signal provided by the arm angle sensor 54 indicates an angle θ of the arm 111 less than a predetermined value θ1. When the angle θ of the arm 111 is less than the predetermined value θ1, the height h of the arm 111 is less than a predetermined value h1. Upon making an affirmative decision in step S2 in FIG. 1, the main controller 20 determines that the wheel loader 100 is currently in the excavation work state and the processing proceeds to step S3 to enter an excavation work mode. If, on the other hand, a negative decision is made in step S2, the processing proceeds to step S4.

In step S4, the main controller 20 makes a decision based upon the acceleration signal provided from the accelerator pedal sensor 52 as to whether or not the accelerator pedal has been operated to be stepped on. If a pedal operation quantity equal to or greater than a predetermined value is detected via the accelerator pedal sensor 52, the main controller 20 decides in step S4 that a pedal operation has been performed, but if a pedal operation quantity less than the predetermined value is detected via the accelerator pedal sensor 52, the main controller 20 decides in step S4 that no pedal operation has been performed.

Upon making an affirmative decision in step S4, the main controller 20 determines that the wheel loader 100 is currently in a traveling state, in which the traveling drive device 100D is being driven. In this case, the processing proceeds to step S5, in which the main controller 20 makes a decision based upon the pilot pressure signal provided from the pilot pressure sensor 56 as to whether or not the pilot pressure p is less than the predetermined value p1. Upon making an affirmative decision in step S5, the main controller 20 determines that the wheel loader 100 is currently in a work device non-engaged state, in which the work device 100H is not being driven. In this case, the processing proceeds to step S6 to enter a traveling drive device solo operation mode. Upon making a negative decision in step S5, the main controller 20 determines that the wheel loader 100 is currently in both the traveling state, in which the traveling drive device 100D is being driven, and in a work device engaged state, in which the work device 100H is being driven. The processing proceeds to step S7 to enter a combination operation mode, in which the traveling drive device 100D and the work device 100H are both engaged in operation.

Upon making a negative decision in step S4, the main controller 20 determines that the wheel loader 100 is currently in a non-traveling state in which the traveling drive device 100D is not being driven. In this case, the processing proceeds to step S8, in which the main controller 20 makes a decision based upon the detection signal provided from the pilot pressure sensor 56 as to whether or not the pilot pressure p is equal to or greater than the predetermined value p1. Upon making an affirmative decision in step S8, the main controller 20 determines that the wheel loader 100 is currently in a work device engaged state, in which the work device 1008 is being driven. The processing proceeds to step S9 to enter a work device solo operation mode.

Figure 16:
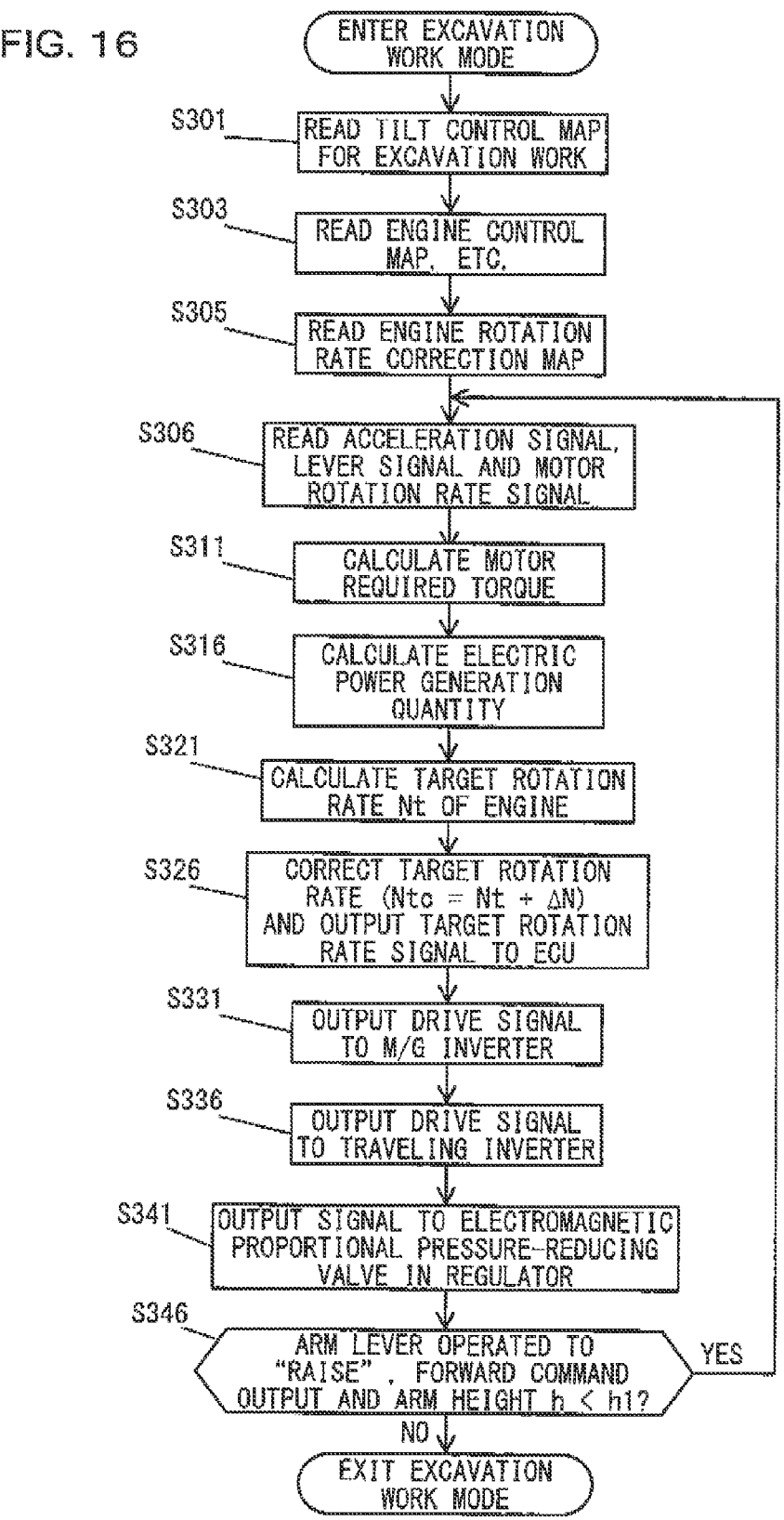
FIG. 16 presents a flowchart of an example of operation processing that may be executed by the main controller in the excavation work mode.

In reference to FIG. 16, the flow of the operation processing executed by the main controller 20 in the excavation work mode will be explained. As FIG. 16 shows, in step S301, to which the processing proceeds after entering the excavation work triode, the main controller 20 reads the tilt control map to be used for excavation work (see FIG. 9($a$)). In step S303, the main controller 20 reads the engine control map to be used in conjunction with the traveling drive device (see FIG. 5($b$)), the electric power generation map (see FIG. 5($a$)) and the motor required torque map (see FIG. 4), before the processing proceeds to step S305. In step S305, the main controller 20 reads the engine rotation rate correction map for combination work (see FIG. 7), and then the processing proceeds to step S306. In step S306, the main controller 20 reads the acceleration signal, the lever signal and the motor rotation rate signal, before the processing proceeds to step S311.

In step S311, the main controller 20 calculates, based upon the acceleration signal and the motor rotation rate signal having been read, a motor required torque Tr by referencing the motor required torque map (sec FIG. 4), and then the processing proceeds to step S316. In step S316, the main controller 20 calculates the electric power generation quantity Pe based upon the motor required torque by referencing the electric power generation map (see FIG. 5($a$)) and then the processing proceeds to step S321. In step S321, the main controller 20 calculates, based upon the electric power generation quantity Pe, the target rotation rate Nt of the engine 1 by referencing the engine control map for the traveling drive device (see FIG. 5($b$)), and then the processing proceeds to step S326.

In step S326, the main controller 20 calculates, based upon the lever signal, a correction rotation rate ΔN by referencing the engine rotation rate correction map for combination work (see FIG. 7). The main controller 20 then calculates a corrected target rotation rate Ntc for the engine 1 by adding a correction rotation rate ΔN calculated as described above to the target rotation rate Nt initially of the engine 1, and outputs the corrected target rotation rate Ntc of the engine 1 to the engine controller 21. The engine controller 21 then compares the actual rotation rate Na of the engine 1 with the corrected target rotation rate Ntc and controls the fuel injection device so as to adjust the actual rotation rate Na of the engine 1 toward the corrected target rotation rate Ntc.

In step S331, the main controller 20 outputs a drive signal to be used to convert AC power in the electric power generation quantity Pe having been calculated in step S316, to DC power, to the M/G inverter 25. The three-phase AC power generated by the motor/generator 5 is converted to DC power by the M/G inverter 25, and DC power in the electric power generation quantity Pe is provided to the traveling inverter 24.

In step S336, the main controller 20 outputs a drive signal to be used to convert the DC power provided from the M/G inverter 25 to three-phase AC power, to the traveling inverter 24. In response, the traveling inverter 24 converts the DC power resulting from the M/G inverter 25 converting the three-phase AC signal provided from the motor/generator 5 into DC, to three-phase AC power. The three-phase AC power resulting from the conversion by the traveling inverter 24 is then provided to the traveling motor 4. As the three-phase AC power supplied to the traveling motor 4 rotationally drives the traveling motor 4, a rotational torque corresponding to the motor required torque Tr having been calculated in step S311 is generated, and the traveling drive device 100D is driven with this rotational torque.

In step S341, the main controller 20 outputs, based upon the lever signal, a signal to be used to control the electromagnetic proportional pressure-reducing valve 64 in the regulator 6 by referencing the tilt control map for excavation work (see FIG. 9($a$)). During excavation work, the tilt of the hydraulic pump 10 is limited so that the extent of tilt does not exceed the predetermined value q_L. The predetermined value q_L may be, for instance, approximately 30% of a maximum tilt q_max.

In step S346, decision-making processing similar to that executed in step S2 described earlier is executed. Namely, the main controller 20 makes a decision as to whether or not the following conditions are all satisfied: the arm lever 57 has been operated to the electromagnetic hold position "raise", the forward/reverse changeover switch 51 has been operated to the forward position and the height h of the arm 111 is detected to be less than the predetermined value h1.

If an affirmative decision is made in step S346, the processing returns to step S306 to continue the processing in the excavation work mode, whereas if a negative decision is made in step S346, the processing exits the excavation work mode and the processing returns to step S1.

In the excavation work mode described above, the tilt of the hydraulic pump 10 is controlled based upon the tilt control map for excavation work (see FIG. 9(a)) and the drive of the traveling motor 4 is controlled based upon the pedal operation quantity of the accelerator pedal. In addition, the engine rotation rate is controlled based upon the pedal operation quantity of the accelerator pedal and the lever operation quantity of the arm lever 57. Since the arm lever 57 has been operated to the "raise" position and the operator is pressing on the accelerator pedal, the engine rotation rate increases. However, the tilt of the hydraulic pump 10 is restricted in the lever operation quantity range equal to and above a predetermined value (the pilot pressure p2), and thus, the maximum output is kept down. In other words, higher priority is given to the traveling load over the work load, i.e., higher priority is given to assurance of good tractive force, during the excavation work (see FIG. 13).

If the arm 111 of a work vehicle equipped with a torque converter of the related art is raised too fast during excavation work, the bucket 112 will not bite into the excavation target, i.e., the dirt mound, to a full extent, and for this reason, the volume of material excavated may not be optimal. If, on the other hand, the arm 111 is raised too slowly during excavation work, the bucket 112 may push too far into the mound, resulting in slippage (spinning) of the front wheels 113. In contrast, excavation work is performed in the embodiment with the arm raising speed regulated by controlling the pump tilt during excavation work, as indicated in FIG. 9(a), while at the same time generating a high level of tractive force by outputting the required torque corresponding to the accelerator pedal operation quantity via the traveling motor 4. As a result, the excavation work can be performed with a high level of efficiency.

Figure 17:
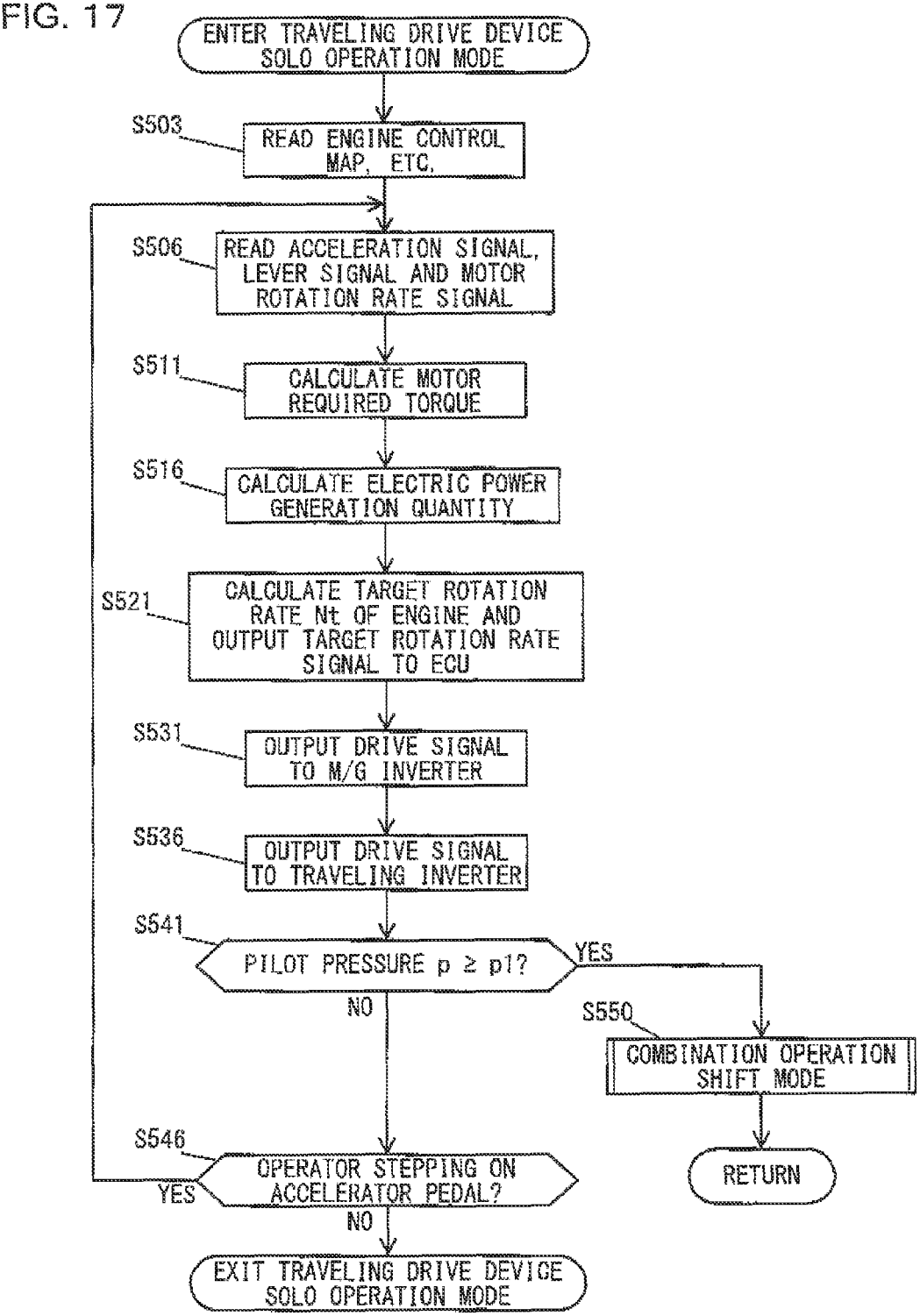
FIG. 17 presents a flowchart of an example of operation processing that may be executed by the main controller in the traveling drive device solo operation mode.

In reference to FIG. 17, the flow of the operation processing executed by the main controller 20 in the traveling drive device solo operation mode will be explained. As FIG. 17 shows, in step S503, to which the processing proceeds after entering the traveling drive device solo operation mode, the main controller 20 reads the engine control map to be used in conjunction with the traveling drive device (see FIG. 5(b)), the electric power generation quantity map (see FIG. 5(a)) and the motor required torque map (see FIG. 4), before the processing proceeds to step S506. In step S506, the main controller 20 reads the acceleration signal, the lever signal and the motor rotation rate signal, before the processing proceeds to step S511.

In step S511, the main controller 20 calculates, based upon the acceleration signal and the motor rotation rate signal having been read, a motor required torque Tr by referencing the motor required torque map (see FIG. 4), and then the processing proceeds to step S516. In step S516, the main controller 20 calculates based upon the motor required torque Tr, the electric power generation quantity Pe by referencing the electric power generation quantity map (see FIG. 5(a)) and then the processing proceeds to step S521.

In step S521, the main controller 20 calculates, based upon the electric power generation quantity Pe, the target rotation rate Nt of the engine 1 by referencing the engine control map for the traveling drive device (see FIG. 5(b)), and outputs the target rotation rate Nt thus calculated of the engine 1 to the engine controller 21. The engine controller 21 compares the actual rotation rate Na of the engine 1 with the target rotation rate Nt and controls the fuel injection device so as to adjust the actual rotation rate Na of the engine 1 toward the target rotation rate Nt.

In step S531, the main controller 20 outputs a drive signal, to be used to convert AC power in the electric power generation quantity Pe having been calculated in step S516 to DC power, to the M/G inverter 25. The three-phase AC power generated by the motor/generator 5 is converted to DC power by the M/G inverter 25, and the DC power in the electric power generation quantity Pe is provided to the traveling inverter 24.

In step S536, the main controller 20 outputs a drive signal, to be used to convert the DC power provided from the M/G inverter 25 to three-phase AC power, to the traveling inverter 24. In response, the traveling inverter 24 converts the DC power resulting from the DC conversion of the three-phase AC signal provided from the motor/generator 5 at the M/G inverter 25, to three-phase AC power. The three-phase AC power resulting from the conversion by the traveling inverter 24 is supplied to the traveling motor 4. As the three-phase AC power supplied to the traveling motor 4 rotationally drives the traveling motor 4, a rotational torque corresponding to the motor required torque Tr having been calculated in step S511 is generated, and the traveling drive device 100D is driven with this rotational torque.

In step S541, the main controller 20 makes a decision as to whether or not the pilot pressure p is equal to or greater than the predetermined value p1. Upon making an affirmative decision in step S541, the main controller 20 determines that the wheel loader 100 is currently in the work device engaged state in which the work device 100H is being driven. In this case, the processing proceeds to step S550 to enter the combination operation shift mode. If, on the other hand, a negative decision is made in step S541, processing proceeds to step S546.

In step S546, the main controller 20 makes a decision, based upon the acceleration signal provided by the accelerator pedal sensor 52, as to whether or not the accelerator pedal has been operated with a pedal operation quantity equal to or greater than a predetermined value. If the accelerator pedal sensor 52 has detected a pedal operation quantity equal to or greater than the predetermined value and an affirmative decision is made in step S546 as a result, the processing returns to step S506 to continuously hold the traveling drive device solo operation mode. If, on the other hand, the pedal operation quantity detected by the accelerator pedal sensor 52 is less than the predetermined value and a negative decision is made in step S546 as a result, the processing exits the traveling drive device solo operation mode and returns to step S1.

It is to be noted that although not shown, as the charging rate of the power storage element 7 becomes lower while the wheel loader travels, the main controller 20 and the engine controller 21 increase the engine rotation rate and the resulting excess energy is used to charge the power storage element 7.

As described above, in the operation mode that is set in the wheel loader 100 when the work device 100H is not being driven and is thus in the non-engaged state while a traveling state, in which the traveling drive device 100D is being driven, is also in effect, i.e., when the wheel loader 100 is in the traveling drive device solo operation mode, the rotation rates of the traveling motor 4 and the engine 1 are controlled based upon the pedal operation quantity detected by the accelerator pedal sensor 52. For instance, while the wheel loader 100 is approaching the mound 130, as indicated by the arrow a in FIG. 12, the work device 100H is not engaged and accordingly, the engine rotation rate is controlled based upon the electric power generation quantity Pe needed to rotate traveling motor 4.

In reference to FIG. 18, the flow of the operation processing executed by the main controller 20 in the combination operation shift mode will be explained. In a work vehicle equipped with a torque converter known in the related art, the engine is controlled at a rotation rate set in advance to a high value in order to ensure that the engine does not stall under a work load applied while the work vehicle is traveling. In contrast, a stall of the engine 1 is prevented in the wheel loader 100 achieved in the embodiment through the processing executed in the combination operation shift mode, and thus, the need to allow for a margin in the engine rotation rate in the traveling drive device solo operation mode is eliminated. In other words, the embodiment enables efficient rotation rate control for the engine 1, which makes it possible to reduce fuel consumption, exhaust and noise.

Figure 18:
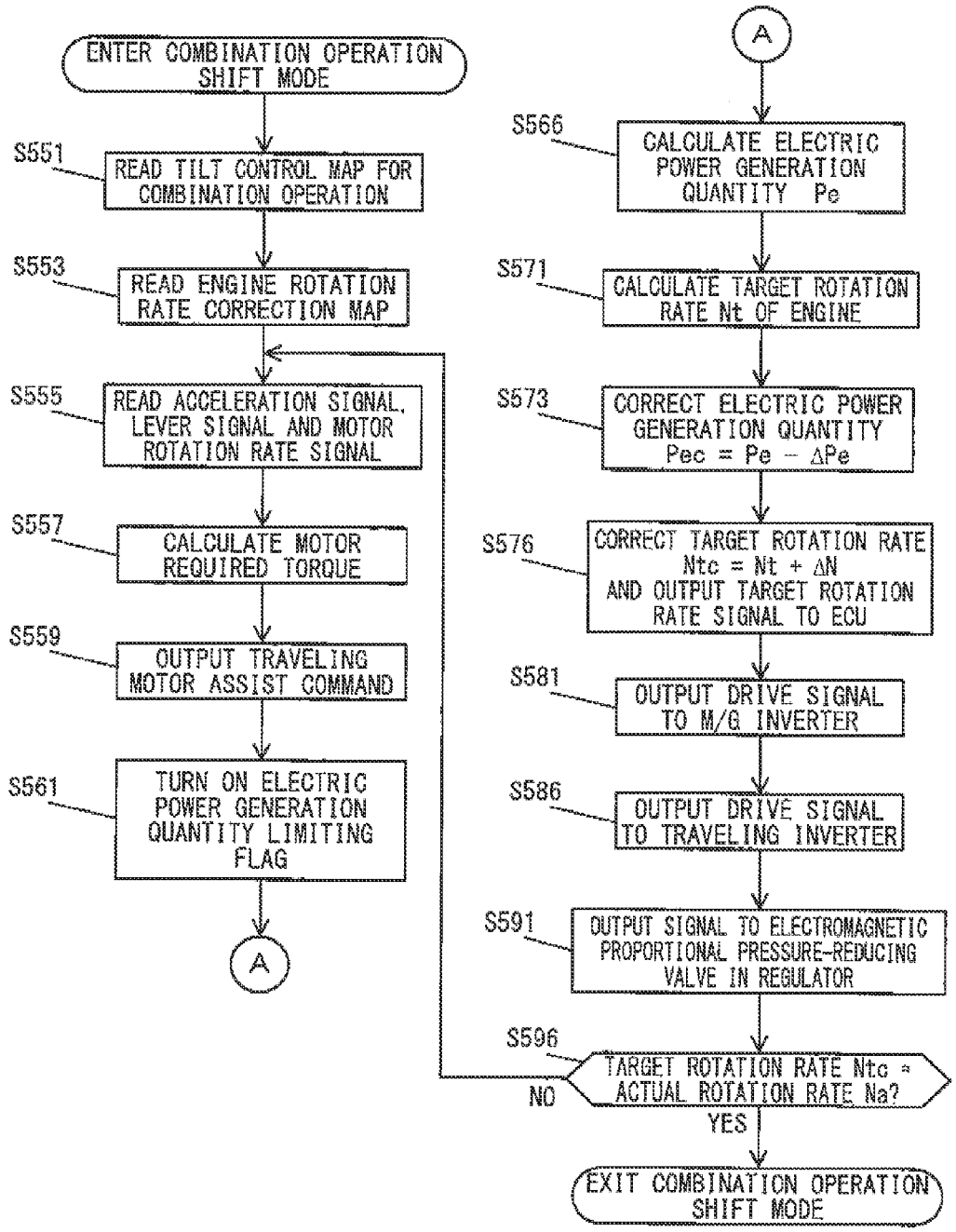
FIG. 18 presents a flowchart of an example of operation processing that may be executed by the main controller in the combination operation shift mode.

As shown in FIG. 18, as the processing in the combination operation shift mode starts, the main controller 20 reads the tilt control map for combination operation (see FIG. 9(b)) in step S551, and then the processing proceeds to step S553.

In step S553, the main controller 20 reads the engine rotation rate correction map for combination work (see FIG. 7), before the processing proceeds to step S555. In step S555, the main controller 20 reads the acceleration signal, the lever signal and the motor rotation rate signal, before the processing proceeds to step S557. In step S557, the main controller 20 calculates, based upon the acceleration signal and the motor rotation rate signal having been read, a motor required torque Tr by referencing the motor required torque map (see FIG. 4), and then the processing proceeds to step S559.

In step S559 the main controller 20 outputs a traveling motor assist command to the converter 27 and the traveling inverter 24. The converter 27 boosts the DC power at the power storage element 7 and adds the boosted power to the DC power provided from the M/G inverter 25. The combined DC power is converted to three-phase AC power by the traveling inverter 24 and the three-phase AC power resulting from the conversion is supplied to the traveling motor 4, where it is used to rotationally drive the traveling motor 4. As the traveling motor 4 is rotationally driven, the traveling drive device 100D is driven.

In step S561, the main controller 20 turns on an electric power generation quantity limiting flag and the processing then proceeds to step S566. In step S566, the main controller 20 calculates the electric power generation quantity Pe based upon the motor required torque Tr by referencing the electric power generation quantity map (see FIG. 5(a)), before the processing proceeds to step S571. In step S571, the main controller 20 calculates the target rotation rate Nt of the engine 1 based upon the electric power generation quantity Pe by referencing the engine control map for the traveling drive device (see FIG. 5(b)), and the processing then proceeds to step S573.

In step S573, the main controller 20 sets, as a corrected electric power generation quantity Pec=Pe−ΔPe, the difference obtained by subtracting an assist electric power generation quantity ΔPe, attributed to the power storage element 7, from the electric power generation quantity Pe calculated in step S566, and then the processing proceeds to step S576. The main controller 20 calculates the required engine output based upon the pump tilt angle and the pump output pressure, and designates an electric power generation quantity equivalent to this output as the assist electric power generation quantity ΔPe.

In step S576, the main controller 20 calculates a correction rotation rate ΔN based upon the lever signal by referencing the engine rotation rate correction map for combination work (see FIG. 7). The main controller 20 calculates a corrected target rotation rate Ntc of the engine 1 by adding a correction rotation rate ΔN having been calculated as described above to the target rotation rate Nt of the engine 1, and outputs the corrected target engine rotation rate Ntc of the engine 1 to the engine controller 21. The engine controller 21 compares the actual rotation rate Na of the engine 1 with the corrected target rotation rate Ntc, and controls the fuel injection device so as to adjust the actual rotation rate Na of the engine 1 toward the corrected target rotation rates Ntc.

In step S581, a drive signal to be used to obtain DC power in the electric power generation quantity Pec=Pe−ΔPe calculated in step S566, is output to the M/G inverter 25. Namely, the output of the AC power generated by the motor/generator 5 is limited by an extent equivalent to the assist electric power generation quantity ΔPe described earlier. The three-phase AC power (Pec=Pe−ΔPe) generated by the motor/generator 5 is converted to DC power (Pec) by the M/G inverter 25. DC power (Pe), representing the sum of this DC power (Pec) and the DC power (ΔPe) provided from the power storage element 7 in the assist electric power generation quantity combined together, is supplied to the traveling inverter 24.

In step S586, the main controller 20 outputs a drive signal to be used to convert the DC power to three-phase AC power to the traveling inverter 24. The traveling inverter 24 converts the DC power (Pe) supplied to the traveling inverter 24 to three-phase AC power and supplies the three-phase AC power resulting from the conversion to the traveling motor 4. As the traveling motor 4 is rotationally driven with the three-phase AC power supplied thereto, a rotational torque corresponding to the motor required torque Tr calculated in step S557 is generated, and the traveling drive device 100D is driven with this rotational torque.

In step S591, the main controller 20 outputs a signal to be used to control the electromagnetic proportional pressure-reducing valve 64 in the regulator 6, which is generated, based upon the lever signal, by referencing the tilt control map for combination operation (see FIG. 9(b)). In the combination operation shift mode, the tilt of the hydraulic pump 10 increases over a range in which the pilot pressure p is equal to or greater than the predetermined value p2. This means that when the wheel loader shifts from the traveling drive device solo operation mode into the combination operation mode, the tilt starts to increase relative to the lever operation quantity with timing retarded compared to the timing with which the tilt starts to increase during the excavation work described earlier and during the work device solo operation, which will be described in detail later. Since the work load, which does not apply in the traveling drive device solo operation mode, will not come into effect until the pilot pressure p becomes equal to the predetermined value p2, even after the pilot pressure p reaches the predetermined value p1 in response to a lever operation and the wheel loader shifts into the combination operation mode, an engine stall is prevented.

In step S596, the main controller 20 makes a decision as to whether or not the actual rotation rate Na of the engine has been adjusted to a value close to the target rotation rate Nt. The main controller 20 determines that the actual rotation rate Na target rotation rate Ntc if the difference between the actual rotation rate Na of the engine 1 and the corrected target rotation rate Ntc is less than a predetermined value. Upon making an affirmative decision in step S596, the processing exits the combination operation shift mode and returns to step S1. When exiting the combination operation shift mode, the main controller 20 resets the electric power generation quantity limiting flag. If, on the other hand, a negative decision is made in step S596, the processing returns to step S555 and the processing in the combination operation shift mode is continuously executed.

As described above, in the combination operation shift mode, the tilt of the hydraulic pump 10 is controlled based upon the tilt control map for combination operation (see FIG. 9(b)) and the drive of the traveling motor 4 is controlled based upon the pedal operation quantity of the accelerator pedal. In addition, the engine rotation rate is controlled based upon the pedal operation quantity of the accelerator pedal and the lever operation quantity of the arm lever 57.

While the engine rotation rate is corrected so that it increases in correspondence to the lever signal generated in response to an operation all of the arm lever 57 performed by the operator in the traveling state, the actual rotation rate Na of the engine 1 does not immediately increase to the corrected target rotation rate Ntc. In the embodiment, the traveling motor 4 is transiently assisted with power provided from the power storage element 7 on as to limit the power generation load by reducing the electric power generation quantity by an extent corresponding to the assist. As a result, an unintended stoppage of the engine 1, i.e., an engine stall, can be prevented.

An instance in which a work load is added while power Pge=50 kW is supplied from the M/G inverter 25 to the traveling inverter 24 and power Pce=0 kW is supplied from the converter 27 to the traveling inverter 24 (the traveling drive device solo operation mode), as illustrated in the conceptual diagram presented in FIG. 21, will be examined as an example.

Upon detecting engagement of the work device 100H, the main controller 20 enters the combination operation shift mode described above. It then reduces the power Pge supplied from the M/G inverter 25 to the traveling inverter 24 to, for instance, 30 kW and increases the power Pee supplied from the converter 27 to the traveling inverter 24 to 20 kW as indicated in the conceptual diagram presented in FIG. 21. Since a load Pem applied to the engine 1 is the sum of a power generation load Pgm and a work load Ppm, the work load Ppm can be increased by an extent matching the extent to which the power generation load Pgm decreases in correspondence to the decrease in the power Pge under assist control, thereby making it possible to allow a greater margin in the work load.

Thus, the engine 1 does not stall in the embodiment even if an added work load is applied while the wheel loader is traveling; for instance, as the operator operates the arm lever 57 to the "raise" position in order to raise the arm 111 in the traveling state, as illustrated in FIG. 14. In the embodiment, the traveling motor 4 is assisted in step S559 and, in addition, the target rotation rate Nt, having been calculated based upon the pedal operation quantity during a lever operation initial phase (pilot pressure p=p1) is corrected in step S576 to a higher target rotation rate Ntc for the rotation rate of the engine 1. A work load added during the lever operation initial phase (pilot pressure p=p1) in the traveling state does not come into effect immediately. Namely, the rotation rate of the engine 1 is raised in advance before the work load takes effect in the embodiment so as to reliably prevent the engine from stalling.

Figure 19:
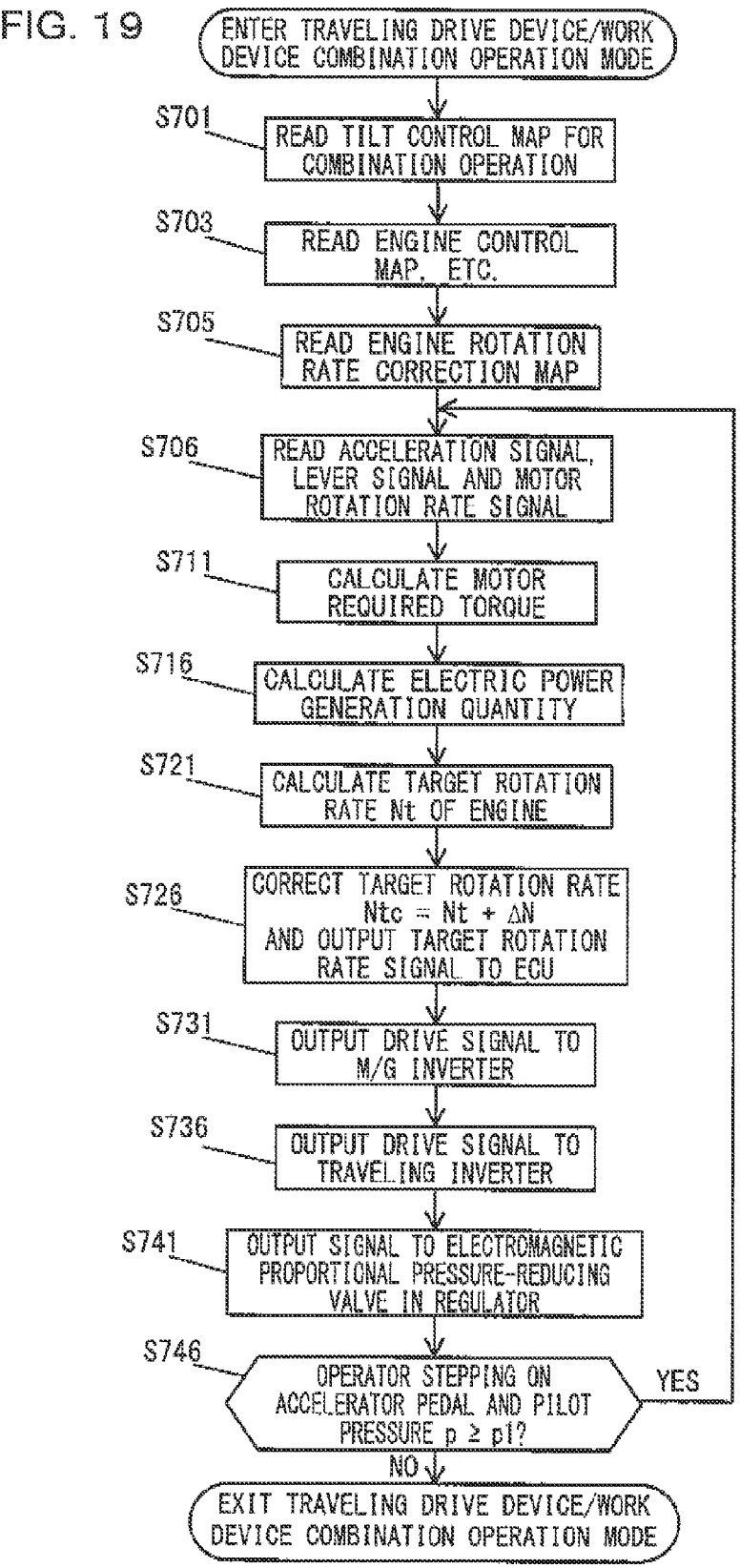
FIG. 19 presents a flowchart of an example of operation processing that may be executed by the main controller in the combination operation mode, in which the traveling drive device and the work device are engaged in operation together.

In reference to FIG. 19, the flow of the operation processing executed by the main controller 20 in the combination operation mode in which the traveling drive device and the work device are both engaged in operation will be explained. As FIG. 19 shows, as the processing in the traveling drive device/work device combination operation mode starts, the main controller 20 reads the tilt control map for combination operation (see FIG. 9(b)) in step S701, and then the processing proceeds to step S703. In step S703, the main controller 20 reads the engine control map for the traveling drive device (see FIG. 5(b)), the electric power generation quantity map (see FIG. 5(a)) and the motor required torque map (see FIG. 4), before the processing proceeds to step S705.

In step S705, the main controller 20 reads the engine rotation rate correction map for combination work (see FIG. 7) and the processing then proceeds to step S706. In step S706, the main controller 20 reads the acceleration signal, the lever signal and the motor rotation rate signal, and the processing proceeds to step S711.

In step S711, the main controller 20 calculates, based upon the acceleration signal and the motor rotation rate signal having been read, the motor required torque Tr by referencing the motor required torque map (see FIG. 4), and then the processing proceeds to step S716. In step S716, the main controller 20 calculates based upon the motor required torque Tr, the electric power generation quantity Pe by referencing the electric power generation quantity map (see FIG. 5(a)) and then the processing proceeds to step S721. In step S721, the main controller 20 calculates, based upon the electric power generation quantity Pe, the target rotation rate Nt of the engine 1 by referencing the engine control map for the traveling drive device (see FIG. 5(b)) and then the processing proceeds to step S726.

In step S726, the main controller 20 calculates a correction rotation rate ΔN based upon the lever signal by referencing the engine rotation rate correction map for combination work (see FIG. 7). The main controller 20 calculates a corrected target rotation rate Ntc of the engine 1 by adding a correction rotation rate ΔN having been calculated as described above to the target rotation rate Nt of the engine 1, and outputs the corrected target engine rotation rate Ntc of the engine 1 to the engine controller 21. The engine controller 21 compares the actual rotation rate Na of the engine 1 with the corrected target rotation rate Ntc, and controls the fuel injection device so as to adjust the actual rotation rate Na of the engine 1 toward the corrected target rotation rates Ntc.

In step S731, the main controller 20 outputs a drive signal, to be used to convert AC power in the electric power generation quantity Pe having been calculated in step S716 to DC power, to the M/G inverter 25. The three-phase AC power generated by the motor/generator 5 is converted to DC power by the M/G inverter 25, and the DC power in the electric power generation quantity Pe is provided to the traveling inverter 24.

In step S736, the main controller 20 outputs a drive signal, to be used to convert the DC power provided from the M/G inverter 25 to three-phase AC power, to the traveling inverter 24. In response, the traveling inverter 24 converts the DC power resulting from the DC conversion of the three-phase AC signal, provided from the motor/generator 5, at the M/G inverter 25, to three-phase AC power. The three-phase AC power resulting from the conversion at the traveling inverter 24 is then provided to the traveling motor 4. As the three-phase AC power supplied to the traveling motor 4 rotationally drives the traveling motor 4, a rotational torque corresponding to the motor required torque Tr having been calculated in step S711 is generated, and the traveling drive device 100D is driven with this rotational torque.

In step S741, the main controller 20 outputs a signal, to be used to control the electromagnetic proportional pressure-reducing valve 64 in the regulator 6, which is generated based upon the lever signal by referencing the tilt control map for combination operation (see FIG. 9(b)). During a combination operation, the tilt of the hydraulic pump 10 increases over the range in which the pilot pressure p is equal to or greater than the predetermined value p2.

In step S746, a decision is read as to whether or not the operator has stepped on the accelerator pedal and the pilot pressure p is equal to or greater than the predetermined value p1.

Upon making an affirmative decision in step S746, the processing returns to step S706 and in this case, the traveling drive device/work device combination operation mode is sustained, whereas upon making a negative decision in step S746, the processing exits the traveling drive device/work device combination operation mode and returns to step S1.

As described above, in the traveling drive device/work device combination operation mode, the tilt of the hydraulic pump 10 is controlled based upon the tilt control map for combination operation (see FIG. 9(b)) and also, the drive of the traveling motor 4 is controlled based upon the pedal operation quantity of the accelerator pedal. In addition, the engine rotation rate is controlled based upon the pedal operation quantity of the accelerator pedal and the lever operation quantity of the arm lever 57. As a result, the operator is able to perform combination work utilizing both the traveling drive device 100D and the work device 100H with a high level of efficiency by achieving an optimal load distribution for the traveling drive device 100D and the work device 100H through an operation of the arm lever 57 and an operation of the accelerator pedal.

For instance, in the work mode in which the wheel loader travels as the arm 111 is being raised, as illustrated in FIG. 14, the operator operates the arm lever 57 to the electromagnetic hold position "raise" to achieve electromagnetic hold, and then higher priority can be given to drive of the hydraulic work system over drive of the traveling system by easing off on the accelerator pedal. Since the speed with which the arm 111 is raised can be adjusted as the operator wishes, it can be ensured with ease that the bucket 112 will be raised to the loading height by the time the wheel loader 100 reaches a point in front of the dump truck, and better work efficiency is thereby achieved.

Figure 20:
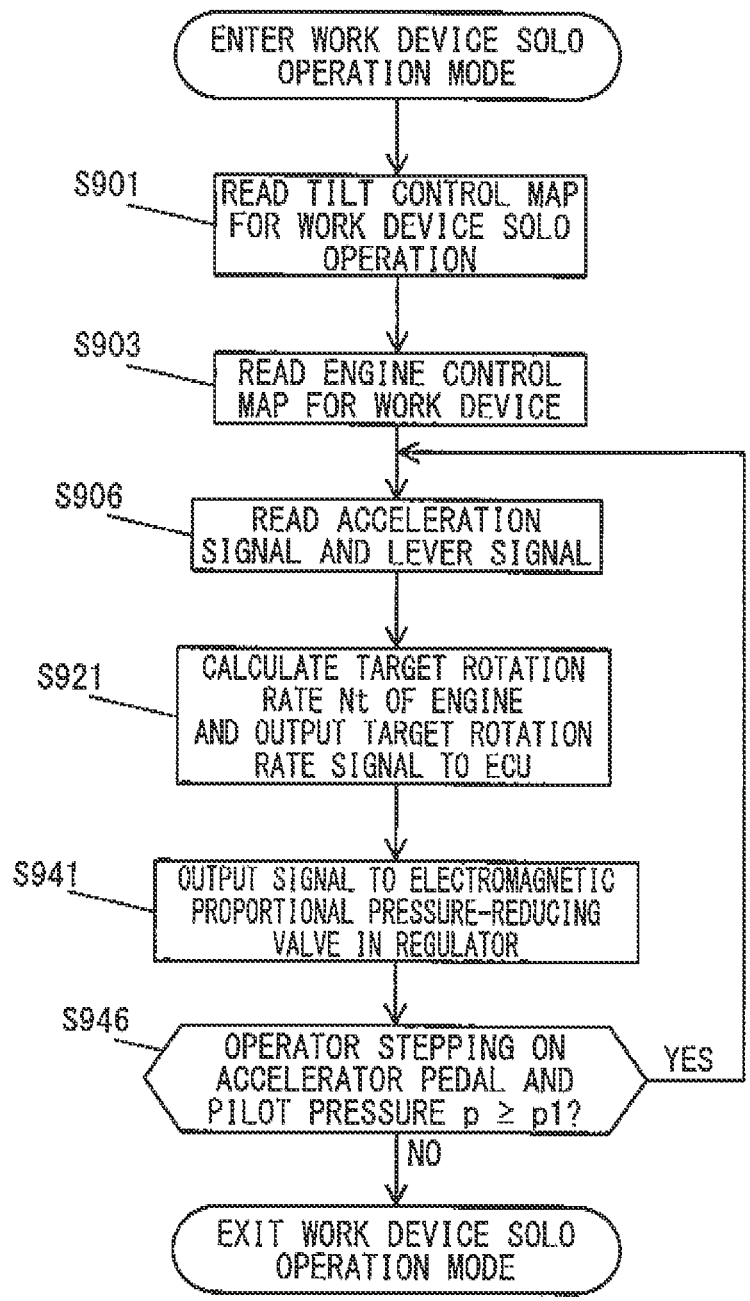
FIG. 20 presents a flowchart of an example of operation processing that may be executed by the main controller in the work device solo operation mode.

In reference to FIG. 20, the flow of the operation processing executed by the main controller 20 in the work device solo operation mode will be explained. As shown in FIG. 20, as the processing in the work device solo operation mode starts, the main controller 20 reads the tilt control map for work device solo operation (see FIG. 8) in step S901 and then the processing proceeds to step S903.

In step S903, the main controller 20 reads the engine control map for the work device (see FIG. 6), before the processing proceeds to step S906. In step S906, the main controller 20 reads the acceleration signal and the lever signal, and then the processing proceeds to step S921.

In step S921, the main controller 20 calculates, based upon the pilot pressure p, the target rotation rate Nt of the engine 1 by referencing the engine control map (see FIG. 6) for the work device, and outputs the target rotation rate Nt of the engine 1 to the engine controller 21. The engine controller 21 compares the actual rotation rate Na of the engine 1 with the target rotation rate Nt and controls the fuel injection device so as to adjust the actual rotation rate Na of the engine 1 toward the target rotation rate Nt.

In step S941, the main controller 20 outputs a signal to be used to control the electromagnetic proportional pressure-reducing valve 64 in the regulator 6, which is based upon the lever signal by referencing the tilt control map for work device solo operation (see FIG. 8).

In step S946, the main controller 20 makes a decision as to whether or not the accelerator pedal remains unoperated and the pilot pressure p is equal to or greater than p1.

Upon freaking an affirmative decision in step S946, the processing returns to step S906 to sustain the work device solo operation mode, whereas upon making a negative decision in step S946, the processing exits the work device solo operation mode and returns to step S1.

As described above, in the operation mode referred to as the work device solo operation mode that is set when the work device 100H is being driven, and is thus in the engaged state, while, at the same time, the traveling drive device 100D is not being driven, i.e., in the non-traveling state, the main controller 20 references the tilt control map for work device solo operation (see FIG. 8). In this operation mode, the tilt of the hydraulic pump 10 is controlled based upon the lever operation quantity at the arm lever 57. In addition, the main controller 20 references the engine control map for the work device 100H (see FIG. 6). On this occasion, the engine rotation rate is controlled based upon the lever operation quantity of the arm lever 57. For instance, when loading dirt or the like into a dump truck, as shown in FIG. 14, the engine 1 is controlled so as to achieve an engine rotation rate corresponding to the lever operation quantity of the arm lever 57 even if the accelerator pedal has not been operated. In this situation, the arm 111 can be raised at a speed corresponding to the lever operation quantity of the arm lever 57.

When a work vehicle, equipped with a torque converter known in the related art, is engaged in loading work, the operator engages the work device 100H in operation with the engine rotation rate raised by operating both the brake pedal and the accelerator pedal to the full extent. For this reason, it is difficult to control the engine to adjust its rotation rate to an optimal rotation rate for the work mode. In contrast, the engine rotation rate of the engine 1 can be controlled via the control lever and thus an engine rotation rate optimal for the work mode can be achieved under the control executed in the embodiment.

While the flowcharts do not include the processing steps pertaining to the SOC control, as mentioned earlier, the main controller 20 controls the engine 1, the M/G inverter 25, the traveling inverter 24, the converter 27 and the like in correspondence to the vehicle operating conditions the charging rate and the like so as to ensure that the charging rate of the power storage element 7 does not fall below a predetermined lower limit value and that it does not exceed a predetermined upper limit value. The vehicle operating conditions may be indicated by, for instance, the vehicle speed information and/or the pedal operation quantity of the accelerator pedal.

The following advantages are achieved with the wheel loader 100 in the embodiment described above.

(1) The rotation rate of the engine 1 is controlled based upon the lever operation quantity and/or the pedal operation quantity in correspondence to whether the work device 100H is in the engaged state or in the non-engaged state and whether the traveling drive device 100D is in the traveling state or in the non-traveling state. As a result, the operator is able to adjust the load distribution for the traveling drive device 100D and the work device 100H in correspondence to the current work state and efficiently perform combination work by using the traveling drive device 100D and the work device 100H with optimal load distribution. As a result, a hybrid work vehicle capable of operating efficiently in correspondence to any work mode and is thus distinct from a work vehicle in the related art, in which the engine rotation rate is controlled entirely based upon the accelerator pedal operation quantity, can be provided.

(2) The traveling motor 4 is rotationally driven to drive the traveling drive device 100D in correspondence to the pedal operation quantity of the accelerator pedal. The work device 100H in this wheel loader 100 is engaged in operation as the engine rotation rate and the tilt are controlled via the control lever and the control valve 11 is controlled via the control lever. Thus, the work device 100H can be operated through control lever operation alone without having to operate the accelerator pedal.

The work device in a work vehicle equipped with a torque converter in the related art is operated by raising the engine rotation rate through an accelerator pedal operation and controlling the control valve via the control lever. In contrast, the engine rotation rate can be controlled via the control lever in the embodiment, which makes it possible to adjust the engine rotation rate more easily and ultimately reduce fuel consumption, exhaust and noise.

(3) In a work vehicle equipped with a torque converter in the related art, the engine rotation rate is set to a high value in advance even when there is no work load in effect in order to prevent an engine stall as the work load is applied in the traveling state. The embodiment is distinguishable in that as the work load is applied in the traveling state, the traveling motor 4 is assisted with power provided from the power storage element 7, and the quantity of power generated by the motor/generator 5 is kept down by an extent corresponding to the assist to result in a reduced power generation load. Through these measures, stalling of the engine is prevented. Since this eliminates the need to set the engine rotation rate to a higher value in advance, the engine 1 can be provided as a more compact unit and, at the same time, fuel consumption, exhaust and noise in the wheel loader in the traveling state can be reduced.

(4) In the embodiment, the engine rotation rate is increased once the pilot pressure p becomes equal to the predetermined value p1, which is lower than the predetermined value pa, in any operation mode other than the work device solo operation mode. Since the engine rotation rate can be raised before the work load is applied in the traveling state, the engine 1 can be very reliably prevented from stalling. Since the engine rotation rate does not need to be raised for the margin while the pilot pressure p is still under the predetermined value p1, fuel consumption, exhaust and noise can be minimized.

(5) in the excavation work mode, restrictions are imposed on the extent to which the tilt of the hydraulic pump 10 increases so as to give higher priority to assuring good tractive force. Since the extent to which the tilt of the hydraulic pump 10 increases is restricted even when the control lever is operated to a significant extent to result in an increase in the output pressure of the hydraulic pump 10, the output volume is also kept down. As a result, the speed with which the arm 111 is raised can be controlled to achieve an optimal speed that is not too high or too low. If the arm 111 is raised too fast in a work vehicle equipped with a torque converter in the related art engaged in excavation work, the bucket 112 will not fully bite into the excavation target mound, i.e., dirt, and thus, only a small volume of dirt may be scooped into the bucket 112. If, on the other hand, the arm 111 is raised too slowly during excavation work, the bucket 112 may be driven too far into the dirt, resulting in slippage (spinning) of the front wheels 113. In contrast, the embodiment makes it possible to generate a great tractive force during excavation work by restricting the arm raising speed under the control executed for the pump tilt, as indicated in FIG. 9(a) and also outputting the required torque, which corresponds to the accelerator pedal operation quantity, via the traveling motor, and thus enables efficient excavation work.

The following variations are also within the scope of the present invention, and one of the variations or a plurality of the variations may be adopted in combination with the embodiment described above.

Variations (1) While control under which the traveling motor 4 is assisted with power provided from the power storage element 7 when the arm lever 57 is operated in the traveling drive device solo operation mode has been described in reference to the embodiment above, the present invention is not limited to this example. Namely, the present invention may instead be adopted in control under which the traveling motor 4 is assisted with power provided from the power storage element 7 when the accelerator pedal is operated in the work device solo operation mode.

(2) While the traveling motor 4 is assisted with power provided from the power storage element 7 with the timing with which the pilot pressure p is detected to be equal to p1 in the embodiment described above, the present invention is not limited to this example. For instance, the assist control may be executed upon detecting that the pilot pressure p is equal to pa. In addition, the tilt control map for combination operation may be set so that the tilt q is in proportion to the pilot pressure p over a range in which the pilot pressure p, indicated by the lever signal, is pa~pb, indicated by the dotted line in FIG. 9(b). In such a case, upon detecting that the pilot pressure p is equal to pa, the output quantity, too, may be raised in correspondence to the increase in the engine rotation rate.

(3) While the tilt control map presented in FIG. 9(b) and the engine rotation rate correction map presented in FIG. 7 are used both in the combination operation shift mode and in the combination operation mode in the embodiment described above, the present invention is not limited to this example. Namely, the tilt control map and the engine rotation rate correction map used in the combination operation mode may be different from the tilt control map and the engine rotation rate correction map used in the combination operation shift mode.

(4) While the decision as to whether or not the traveling drive device 100D is being driven, i.e., whether or not the traveling drive device 100D is in the traveling state, is made by detecting whether or not the operator has stepped on the accelerator pedal and the decision as to whether or not the work device 100H is being driven, i.e. whether or not the work device 100H is an the engaged state, is made by detecting whether or not the lever has been operated in the embodiment, the present invention is not limited to this example. For instance, the traveling state may be detected when, via the vehicle speed sensor 53, a vehicle speed that is equal to or greater than a predetermined value has been detected and the non-traveling state may be detected when, via the vehicle speed sensor 53, a vehicle speed less than the predetermined value has been detected. In addition, the engaged state may be detected when, via the pump pressure sensor 55, a pressure (output pressure) equal to or greater than a predetermined value has been detected and the non-engaged state may be detected when, via the pump pressure sensor 55, a pressure (output pressure) less than the predetermined value has been detected.

(5) While the tilt of the hydraulic pump 10 is controlled in the embodiment described above so that it starts to increase once the pilot pressure becomes equal to the predetermined value p2 greater than the predetermined value pa (see FIG. 9(b)) during a combination operation other than excavation work, performed by engaging both the traveling drive device 100D and the work device 100H in operation, the present invention is not limited to this example. For instance, control may be executed so as to limit the increase in the pump tilt only if the work load, in particular, is high during a combination operation. Namely, the pump tilt may be controlled based upon the tilt control map for work device solo operation presented in FIG. 8 when the work load is low and the pump tilt may be controlled based upon the tilt control map for combination operation presented in FIG. 9(b) only upon deciding that the pump output pressure detected by the pump pressure sensor 55 has become equal to or greater than a predetermined value.

(6) While the corrected target engine rotation rate Ntc (Ntc=Nt+ΔN) is calculated by adding a correction rotation rate ΔN (see FIG. 7) calculated based upon the pilot pressure p to the target engine rotation rate Nt (see FIG. 5(b)) calculated based upon the electric power generation quantity Pe and a signal indicating the corrected target engine rotation rate Ntc is output to the engine controller 21 during combination work including excavation work in the embodiment described above, the present invention is not limited to this example. The maximum value of the target engine rotation rate calculated by referencing both of the engine control map for the traveling drive device and the engine control map for the work device may be selected and a signal indicating the selected target rotation rate may be output to the engine controller 21, instead.

(7) While the wheel loader 100 represents an example of the work vehicle in the description provided above, the present invention is not limited to this example and may be adopted in another type of work vehicle such as a forklift, a telescopic handler or a lift truck.

(8) While the power storage element 7 in the embodiment described above is constituted with a large-capacity electric double-layer capacitor in consideration of installation space, cost, a charge/discharge response rate and the like, the present invention is not limited to this example. Namely, the present invention may be adopted in conjunction with a power storage element configured with secondary battery cells therein that can be repeatedly charged/discharged, such as nickel cadmium batteries, nickel hydride batteries or lithium-ion batteries.

(9) The control units may adopt a configuration other than that described in reference to the embodiment. For instance, the functions of the engine controller 21 may be fulfilled in the main controller 20, and in such a case, the engine controller 21 will not be required. As another alternative, the various functions of the main controller 20 in the embodiment may be distributed among microcomputers each installed in correspondence to a specific function and, in such a case, the microcomputers will replace the main controller 20.

(10) While the main controller 20 determines that the wheel loader 100 is currently engaged in excavation work when the following conditions are all satisfied in the embodiment described above, i.e., an arm raise command is output via the arm lever 57, a forward command for the traveling drive device 100D is output via the forward/reverse changeover switch 51 and the angle of the arm 111 detected based upon the signal provided from the arm angle sensor 54 is less than a predetermined value, the present invention is not limited to this example. For instance, the main controller 20 may determine that the wheel loader 100 is currently engaged in excavation work if a condition that the vehicle speed, detected based upon the signal provided from the vehicle speed sensor 53, is less than a predetermined value and a condition that the pedal operation quantity, detected based upon a signal provided from the accelerator pedal sensor 52, is equal to or greater than a predetermined value, are both satisfied.

(11) While the traveling motor 4 is disposed upon the axis of the rear wheel-side propeller shaft 40R in the embodiment described above, the present invention is not limited to this example and the traveling motor 4 may instead be disposed upon the axis of the front wheel-side propeller shaft 40F.

(12) The present invention does not always need to be adopted in a structure that includes only one traveling motor 4. For instance, it may be adopted in a structure that includes a front wheel-side traveling motor disposed on the axis of the front wheel-side propeller shaft 40F and a rear wheel-side traveling motor disposed upon axis of the rear wheel-side propeller shaft 40R, instead.

The present invention is not limited to the embodiment described above and allows for alterations and modifications to be made freely without departing from the scope of the invention.

The disclosure of the following priority application is herein incorporated by reference: Japanese Patent Application No. 2012-31149 filed Feb. 15, 2012.

The invention claimed is:
1. A hybrid work vehicle, comprising:
a work device that is driven with pressure oil provided from a hydraulic pump driven by an engine;
a traveling drive device that is driven by a traveling motor driven with electric power;
a lever operation quantity detection unit that detects a lever operation quantity of a control lever operated to control the work device;
an engagement state detection unit that detects an engaged state and a non-engaged state of the work device;
a pedal operation quantity detection unit that detects a pedal operation quantity of an accelerator pedal;
a travel state detection unit that detects a traveling state and a non-traveling state of the traveling drive device;
an engine control unit that controls an engine rotation rate of the engine based upon at least either the lever operation quantity or the pedal operation quantity in correspondence to whether the engagement state detection unit has detected the engaged state or the non-engaged state and whether the travel state detection unit has detected the traveling state or the non-traveling state,
a first rotating electric machine that is driven by the engine and generates first AC power;
a first power conversion unit that converts the first AC power, generated by the first rotating electric machine, to first DC power,
a power storage unit that outputs second DC power;
a second power conversion unit that converts at least one of; the first DC power resulting from conversion by the first power conversion unit, and the second DC power output from the power storage unit, to second AC power;
a second rotating electric machine configuring the traveling motor, which is driven with the second AC power resulting from conversion by the second power conversion unit; and
an assist/limit control unit that limits the first AC power based upon a level of the second DC power, wherein
if the engagement state detection unit detects the engaged state while the engine rotation rate is being controlled based upon the pedal operation quantity by the engine control unit upon detection of the traveling state by the travel state detection unit and detection of the non-engaged state by the engagement state detection unit, the second power conversion unit converts power representing a sum of the second DC power and the first DC power, to the second AC power.

2. A hybrid work vehicle according to claim 1, wherein:
when the engagement state detection unit detects the non-engaged state and the travel state detection unit detects the traveling state, the engine control unit controls the engine rotation rate based upon the pedal operation quantity; and
when the engagement state detection unit detects the engaged state and the travel state detection unit detects the non-traveling state, the engine control unit controls the engine rotation rate based upon the lever operation quantity.

3. A hybrid work vehicle according to claim 1, wherein:
the hydraulic pump is a variable-capacity hydraulic pump a capacity of which can be adjusted by altering a tilt of the hydraulic pump; and
the hybrid work vehicle further comprises:
a tilt control unit that increases/decreases the tilt of the hydraulic pump in correspondence to the lever operation quantity; and
a work state decision-making unit that makes a decision as to whether or not the hybrid work vehicle is engaged in excavation work; and wherein
as the work state decision-making unit decides that the hybrid work vehicle is engaged in the excavation work, the tilt control unit limits the tilt to a predetermined value.

4. A hybrid work vehicle according to claim 3, wherein:
the work device includes an arm linked to a body so as to be allowed to rotate up/down and an arm cylinder that drives the arm; and
the control lever outputs at least a raise command and a lower command for the arm; and
the hybrid work vehicle further comprises:
an arm angle detection unit that detects an angle of the arm; and
a forward/reverse command unit that outputs a forward command instructing the hybrid work vehicle to move forward and a reverse command instructing the hybrid work vehicle to move backward; and wherein
when the raise command is output by the control lever, the forward command is output by the forward/reverse command unit and the arm angle detection unit detects that the angle is less than a predetermined value, the work state decision-making unit decides that the hybrid work vehicle is engaged in excavation work.

5. A hybrid work vehicle according to claim 1, wherein:
the travel state detection unit includes the pedal operation quantity detection unit, detects the traveling state if the pedal operation quantity detection unit detects the pedal operation quantity equal to or greater than a first predetermined value and detects the non-traveling state if the pedal operation quantity detection unit detects the pedal operation quantity less than the first predetermined value.

6. A hybrid work vehicle according to claim 1, wherein:
the travel state detection unit includes a vehicle speed sensor that detects a vehicle speed, detects the traveling state if the vehicle speed sensor detects a vehicle speed equal to or greater than a predetermined speed and detects the non-traveling state if the vehicle speed sensor detects a vehicle speed less than the predetermined speed.

7. A hybrid work vehicle according to claim 1, wherein:
the engagement state detection unit includes the lever operation quantity detection unit, detects the engaged state if the lever operation quantity detection unit detects the lever operation quantity equal to or greater than a second predetermined value and detects the non-engaged state if the lever operation quantity detection unit detects the lever operation quantity less than the second predetermined value.

8. A hybrid work vehicle according to claim 1, wherein:
the engagement state detection unit includes a pressure sensor that detects an output pressure of the hydraulic pump, detects the engaged state if the pressure sensor detects a pressure equal to or greater than a predetermined pressure and detects the non-engaged state if the pressure sensor detects a pressure less than the predetermined pressure.

9. A hybrid work vehicle, comprising:
a work device that is driven with pressure oil provided from a hydraulic pump driven by an engine;
a traveling drive device that is driven by a traveling motor driven with electric power;
a lever operation quantity detection unit that detects a lever operation quantity of a control lever operated to control the work device;
an engagement state detection unit that detects an engaged state and a non-engaged state of the work device;
a pedal operation quantity detection unit that detects a pedal operation quantity of an accelerator pedal;
a travel state detection unit that detects a traveling state and a non-traveling state of the traveling drive device;
an engine control unit that controls an engine rotation rate of the engine based upon at least either the lever operation quantity or the pedal operation quantity in correspondence to whether the engagement state detection unit has detected the engaged state or the non-engaged state and whether the travel state detection unit has detected the traveling state or the non-traveling state;
a first rotating electric machine that is driven by the engine and generates first AC power;
a first power conversion unit that converts the first AC power, generated by the first rotating electric machine, to first DC power;
a power storage unit that outputs second DC power;
a second power conversion unit that converts at least one of; the first DC power resulting from conversion by the first power conversion unit, and the second DC power output from the power storage unit, to second AC power; and a second rotating electric machine configuring the traveling motor, which is driven with the second AC power resulting from conversion by the second power conversion unit, wherein if the lever operation quantity detection unit detects the lever operation quantity equal to or greater than a predetermined value while the travel state detection unit detects the traveling state and the engagement state detection unit detects the non-engaged state, the engine control unit further raises the engine rotation rate relative to a target rotation rate based upon the pedal operation quantity.

10. A hybrid work vehicle according to claim 9, wherein:
when the engagement state detection unit detects the non-engaged state and the travel state detection unit detects the traveling state, the engine control unit controls the engine rotation rate based upon the pedal operation quantity; and
when the engagement state detection unit detects the engaged state and the travel state detection unit detects the non-traveling state, the engine control unit controls the engine rotation rate based upon the lever operation quantity.

11. A hybrid work vehicle according to claim 9, wherein:
the hydraulic pump is a variable-capacity hydraulic pump a capacity of which can be adjusted by altering a tilt of the hydraulic pump; and
the hybrid work vehicle further comprises:
a tilt control unit that increases/decreases the tilt of the hydraulic pump in correspondence to the lever operation quantity; and
a work state decision-making unit that makes a decision as to whether or not the hybrid work vehicle is engaged in excavation work; and wherein
as the work state decision-making unit decides that the hybrid work vehicle is engaged in the excavation work, the tilt control unit limits the tilt to a predetermined value.

12. A hybrid work vehicle according to claim 11, wherein:
the work device includes an arm linked to a body so as to be allowed to rotate up/down and an arm cylinder that drives the arm; and
the control lever outputs at least a raise command and a lower command for the arm; and
the hybrid work vehicle further comprises:
an arm angle detection unit that detects an angle of the arm; and a forward/reverse command unit that outputs a forward command instructing the hybrid work vehicle to move forward and a reverse command instructing the hybrid work vehicle to move backward; and wherein
when the raise command is output by the control lever, the forward command is output by the forward/reverse command unit and the arm angle detection unit detects that the angle is less than a predetermined value, the work state decision-making unit decides that the hybrid work vehicle is engaged in excavation work.

13. A hybrid work vehicle according to claim 9, wherein:
the travel state detection unit includes the pedal operation quantity detection unit, detects the traveling state if the pedal operation quantity detection unit detects the pedal operation quantity equal to or greater than a first predetermined value and detects the non-traveling state if the pedal operation quantity detection unit detects the pedal operation quantity less than the first predetermined value.

14. A hybrid work vehicle according to claim 9, wherein:
the travel state detection unit includes a vehicle speed sensor that detects a vehicle speed, detects the traveling state if the vehicle speed sensor detects a vehicle speed equal to or greater than a predetermined speed and detects the non-traveling state if the vehicle speed sensor detects a vehicle speed less than the predetermined speed.

15. A hybrid work vehicle according to claim 9, wherein:
the engagement state detection unit includes the lever operation quantity detection unit, detects the engaged state if the lever operation quantity detection unit detects the lever operation quantity equal to or greater than a second predetermined value and detects the non-engaged state if the lever operation quantity detection unit detects the lever operation quantity less than the second predetermined value.

16. A hybrid work vehicle according to claim 9, wherein:
the engagement state detection unit includes a pressure sensor that detects an output pressure of the hydraulic pump, detects the engaged state if the pressure sensor detects a pressure equal to or greater than a predetermined pressure and detects the non-engaged state if the pressure sensor detects a pressure less than the predetermined pressure.

* * * * *